United States Patent
Nakano et al.

(10) Patent No.: US 12,270,109 B2
(45) Date of Patent: Apr. 8, 2025

(54) SURFACE-TREATED STEEL SHEET AND METHOD FOR MANUFACTURING THE SAME

(71) Applicant: TOYO KOHAN CO., LTD., Tokyo (JP)

(72) Inventors: Yuji Nakano, Kudamatsu (JP); Daisuke Matsushige, Kudamatsu (JP); Koh Yoshioka, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 267 days.

(21) Appl. No.: 16/759,204

(22) PCT Filed: Oct. 26, 2018

(86) PCT No.: PCT/JP2018/039995
§ 371 (c)(1),
(2) Date: Apr. 24, 2020

(87) PCT Pub. No.: WO2019/083044
PCT Pub. Date: May 2, 2019

(65) Prior Publication Data
US 2020/0321566 A1    Oct. 8, 2020

(30) Foreign Application Priority Data
Oct. 27, 2017    (JP) .................... 2017-208584

(51) Int. Cl.
*C25D 5/12*    (2006.01)
*B32B 15/01*    (2006.01)
(Continued)

(52) U.S. Cl.
CPC ............ *C23C 28/02* (2013.01); *B32B 15/011* (2013.01); *C23C 28/021* (2013.01); *C25D 5/12* (2013.01);
(Continued)

(58) Field of Classification Search
CPC ...... C23C 28/02; C23C 28/021; C23C 28/023; C23C 10/02; C23C 10/28; C23C 10/52;
(Continued)

(56) References Cited

U.S. PATENT DOCUMENTS

| 6,270,922 B1 | 8/2001 | Ohmura et al. |
| 2014/0050971 A1* | 2/2014 | Tomomori ............ H01M 10/28 429/176 |
| 2018/0019446 A1 | 1/2018 | Kuniya et al. |

FOREIGN PATENT DOCUMENTS

| CN | 102230200 A | 11/2011 |
| CN | 103597626 A | 2/2014 |

(Continued)

OTHER PUBLICATIONS

Communication dated Aug. 27, 2021 from the China National Intellectual Property Administration in CN Application No. 201880069772.7.

(Continued)

*Primary Examiner* — Humera N. Sheikh
*Assistant Examiner* — Kevin Ct Li
(74) *Attorney, Agent, or Firm* — Sughrue Mion, PLLC

(57) ABSTRACT

A surface-treated steel sheet, including: a steel sheet; and a nickel-cobalt-iron diffusion layer formed as an outermost surface layer on the steel sheet. When a content of Ni, a content of Co and a content of Fe of the nickel-cobalt-iron diffusion layer are determined based on a Ni intensity, a Co intensity and a Fe intensity each sequentially measured in the depth direction from the surface side of the nickel-cobalt-iron diffusion layer by a radio frequency glow discharge optical emission spectrometry, a content of Co at a specific depth position D, $In_{Co\_D}$, is 5% by mass or higher and a content of Fe at the specific depth position D, $In_{Fe\_D}$, is 11% by mass or higher, the specific depth position D being a position where the Ni intensity is 0.5% of the maximum (Continued)

value of the Ni intensity. Also disclosed is a method for manufacturing the surface-treated steel sheet.

7 Claims, 12 Drawing Sheets

(51) Int. Cl.
  *C23C 28/02* (2006.01)
  *C25D 5/00* (2006.01)
  *C25D 5/50* (2006.01)
  *H01M 50/119* (2021.01)
  *H01M 50/124* (2021.01)
  *H01M 50/128* (2021.01)
  *H01M 50/174* (2021.01)

(52) U.S. Cl.
  CPC .............. *C25D 5/50* (2013.01); *C25D 5/605* (2020.08); *H01M 50/119* (2021.01); *H01M 50/1243* (2021.01); *H01M 50/128* (2021.01); *H01M 50/182* (2021.01)

(58) Field of Classification Search
  CPC . C25D 5/12; C25D 5/50; C25D 5/605; C25D 7/0614; B32B 15/011; H01M 50/119; H01M 50/1243; H01M 50/128; H01M 50/182; H01M 50/124; Y02E 60/10
  See application file for complete search history.

(56) References Cited

FOREIGN PATENT DOCUMENTS

| JP | 2007122940 A | * | 5/2007 |
|----|----|----|----|
| JP | 2016-186950 A | | 10/2016 |
| JP | 2016-195007 A | | 11/2016 |
| WO | 98/10475 A1 | | 3/1998 |
| WO | 2012/147843 A1 | | 11/2012 |

OTHER PUBLICATIONS

Office Action dated May 24, 2022 from the Japanese Patent Office in JP Application No. 2019-550355.
Koh Yoshioka, "Development of the Nickel-Colbalt Alloy Planting Material for Alkaline Manganese Battery Cathode Case", Toyo Kohan Co., Ltd., Technical Research Laboratory, Mar. 2017, pp. 7-16.
International Search Report for PCT/JP2018/039995 dated Jan. 29, 2019 (PCT/ISA/210).
Communication dated Apr. 2, 2022 from the China National Intellectual Property Administration in corresponding CN Application No. 201880069772.7.
Office Action dated Nov. 10, 2022 from the Korean Intellectual Property Office in corresponding KR Application No. 10-2020-7013581.

* cited by examiner (A) Example 1

(B) Example 2

(C) Example 3

(D) Example 4

(A) Example 5

(B) Example 6

(C) Example 7

(A) Example 8

(B) Example 10

(C) Example 11

(A) Example 12

(B) Example 13

SURFACE-TREATED STEEL SHEET AND METHOD FOR MANUFACTURING THE SAME

CROSS REFERENCE TO RELATED APPLICATIONS

This application is a National Stage of International Application No. PCT/JP2018/039995 filed Oct. 26, 2018, claiming priority based on Japanese Patent Application No. 2017-208584, filed Oct. 27, 2017.

TECHNICAL FIELD

The present invention relates to a surface-treated steel sheet, and a method for manufacturing the same.

BACKGROUND ART

In recent years, portable devices, such as audio devices and cell phones, have been used in many fields, and as their operating power sources, alkaline batteries, which is primary batteries, and nickel hydrogen batteries, lithium ion batteries and the like, which are secondary batteries, are widely used. For these batteries, the performance enhancement including output raising and life elongation is demanded, and also for battery cases for packing power generating elements including a positive electrode active substance, a negative electrode active substance and the like, the improvement of the performance of the case as an important constituent element of batteries is demanded.

For example, in Patent Document 1, there is disclosed a battery case having a specific nickel-cobalt alloy layer famed on the outermost surface which is to be the inner surface of the battery case in view of improving the battery characteristics when used as a battery case.

PATENT DOCUMENT

Patent Document 1: International Publication No. WO2012/147843

SUMMARY OF THE INVENTION

Problem to be Solved by the Invention

However, in the case of using the battery case of the above Patent Document 1 as a battery case of a battery using a strong alkaline electrolyte solution, such as an alkaline battery, a nickel hydrogen battery or the like, a problem of this case is that the contact resistance value of the inner surface of the battery case contacting with the electrolyte solution rises along with lapse of time to impair the battery characteristics. With regard to this problem, further improvements of battery characteristics are demanded, including the suppression of impairing the battery characteristics after lapse of time.

An object of the present invention is to provide a surface-treated steel sheet excellent in battery characteristics and capable of suppressing impairing the battery characteristics also after lapse of time, in the case of its use as a battery case of a battery using a strong alkaline electrolyte solution. The present invention has also an object to provide a method for manufacturing such a surface-treated steel sheet.

Means for Solving the Problem

As a result of exhaustive studies to achieve the above objects, the present inventors have found that the above objects can be achieved by a surface-treated steel sheet including a steel sheet and a nickel-cobalt-iron diffusion layer as an outermost surface layer formed on the steel sheet when controlling the content of Co and the content of Fe in the surface of the nickel-cobalt-iron diffusion layer within respective specific ranges, as determined by a radio frequency glow discharge optical emission spectrometry on the surface-treated steel sheet, and this finding has led to the completion of the present invention.

Specifically, according to the present invention, there is provided a surface-treated steel sheet comprising a steel sheet and a nickel-cobalt-iron diffusion layer formed as an outermost surface layer on the steel sheet, wherein when a content of Ni, a content of Co and a content of Fe of the nickel-cobalt-iron diffusion layer are determined based on a Ni intensity, a Co intensity and a Fe intensity each sequentially measured in the depth direction from the surface side of the nickel-cobalt-iron diffusion layer by a radio frequency glow discharge optical emission spectrometry, a content of Co at a specific depth position D, $In_{Co\_D}$, is 5% by mass or higher and a content of Fe at the specific depth position D, $In_{Fe\_D}$, is 11% by mass or higher, the specific depth position D being a position where the Ni intensity is 0.5% of the maximum value of the Ni intensity.

In the surface-treated steel sheet according to the present invention, it is preferable that the nickel-cobalt-iron diffusion layer have a content of cobalt of 0.2 g/m$^2$ or higher.

In the surface-treated steel sheet according to the present invention, it is preferable that the nickel-cobalt-iron diffusion layer has $R_{Fe/Co}$ ($In_{Fe\_D}/In_{Co\_D}$) of 0.5 to 20, the $R_{Fe/Co}$ ($In_{Fe\_D}/In_{Co\_D}$) being a ratio of the content of Fe, $In_{Fe\_D}$, with respect to the content of Co, $In_{Co\_D}$.

It is preferable that the surface-treated steel sheet according to the present invention further comprise an iron-nickel diffusion layer between the steel sheet and the nickel-cobalt-iron diffusion layer.

According to the present invention, there is provided a battery case comprising any of the above surface-treated steel sheets.

According to the present invention, there is further provided a battery comprising the above battery case.

According to the present invention, there is also provided a method for manufacturing a surface-treated steel sheet comprising a step of forming a nickel plating layer having a content of nickel of lower than 11.0 g/m$^2$ on a steel sheet, a step of forming a nickel-cobalt alloy plating layer having a total content of nickel and cobalt of 7.5 g/m$^2$ or lower on the nickel plating layer, and a step of subjecting the steel sheet having the nickel plating layer and the nickel-cobalt alloy plating layer formed thereon to a heat treatment at a temperature of 480 to 900° C. to thereby form a nickel-cobalt-iron diffusion layer as an outermost surface layer. At this time, it is preferable that the total content of nickel and cobalt of the nickel plating layer and the nickel-cobalt alloy plating layer be 11.5 g/m$^2$ or lower.

According to the present invention, there is further provided a method for manufacturing a surface-treated steel sheet comprising a step of forming a nickel-cobalt alloy plating layer having a total content of nickel and cobalt of 11.5 g/m$^2$ or lower on a steel sheet, and a step of subjecting the steel sheet having the nickel-cobalt alloy plating layer famed thereon to a heat treatment at a temperature of 480 to 900° C. to thereby form a nickel-cobalt-iron diffusion layer as an outermost surface layer.

Effects of Invention

According to the present invention, there can be provided a surface-treated steel sheet which is excellent in battery characteristics and can suppress impairing the battery characteristics also after lapse of time when used as a battery case of a battery using a strong alkaline electrolyte solution. According to the present invention, there can be also provided a method for manufacturing such a surface-treated steel sheet.

DESCRIPTION OF EMBODIMENTS

Hereinafter, one embodiment according to the present invention will be described based on the drawings. The surface-treated steel sheet according to the present invention is worked into an external shape according to a desired shape of a battery. The battery is not especially limited, but there can be exemplified an alkaline battery, which is a primary battery, or a nickel hydrogen battery, a lithium ion battery or the like, which is a secondary battery. The surface-treated steel sheet according to the present invention can be used as a member of a battery case of these batteries. Hereinafter, the present invention will be described by way of embodiments in which an alkaline battery using a strong alkaline electrolyte solution is taken as one example, and in the embodiments, the surface-treated steel sheet according to the present invention is used for a positive electrode can constituting a battery case of the alkaline battery.

Figure 1:
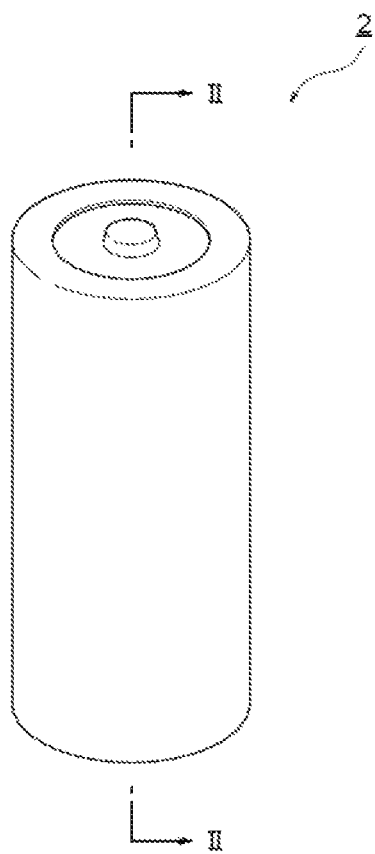
FIG. 1 is a perspective view illustrating one embodiment of a battery to which the surface-treated steel sheet according to the present invention is applied.
Figure 2:
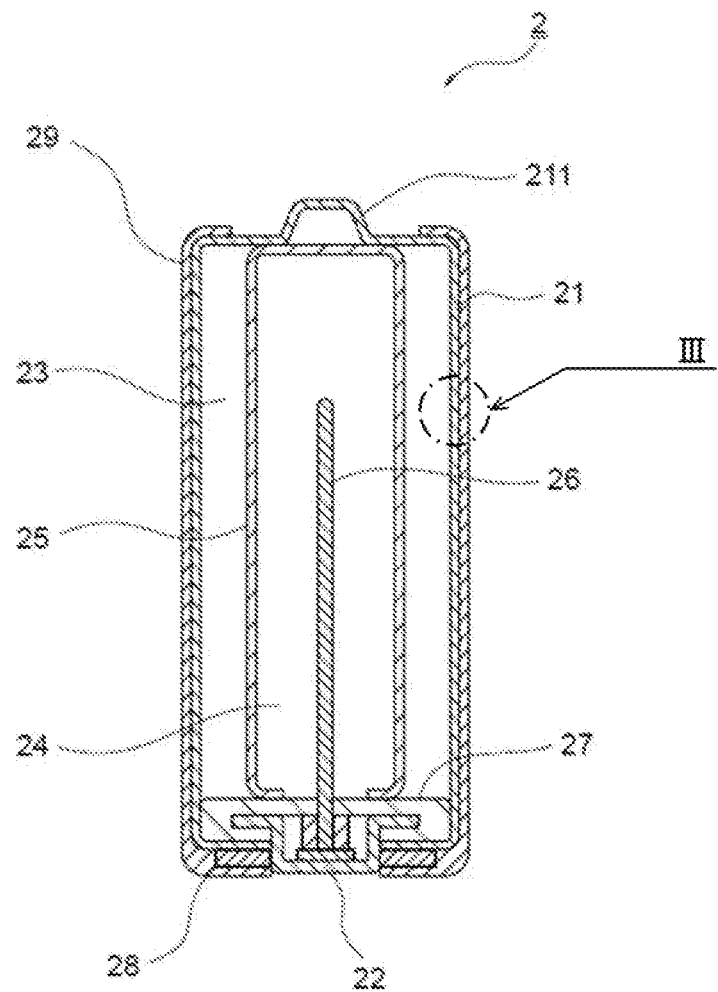
FIG. 2 is a cross-sectional view taken along line II-II of FIG. 1.

FIG. 1 is a perspective view illustrating one embodiment of an alkaline battery 2 to which the surface-treated steel sheet according to the present invention is applied, and FIG. 2 is a cross-sectional view taken along line II-II of FIG. 1. The alkaline battery 2 of the present example has a positive electrode mixture 23 and a negative electrode mixture 24 with a separator 25 interposed therebetween in the interior of a bottomed cylindrical positive electrode can 21, and a sealing body constituted of a negative electrode terminal 22, a current collector 26 and a gasket 27 is caulked on the inner surface-side of an opening of the positive electrode can 21. Then, a protruded positive electrode terminal 211 is famed on the center of the bottom of the positive electrode can 21. Then, for imparting insulation, improving designability, and other purposes, an outer package 29 is fitted on the positive electrode can 21 via an insulating ring 28.

The positive electrode can 21 of the alkaline battery 2 illustrated in FIG. 1 can be obtained by forming the surface-treated steel sheet according to the present invention by a deep drawing process, a drawing and ironing process (DI work process), a drawing and thin-redrawing process (DTR work process), a combined work process of stretching work and ironing work after drawing work, or the like. Hereinafter, with reference to FIG. 3, a constitution of the surface-treated steel sheet (surface-treated steel sheet 1) according to the present invention will be described.

Figure 3:
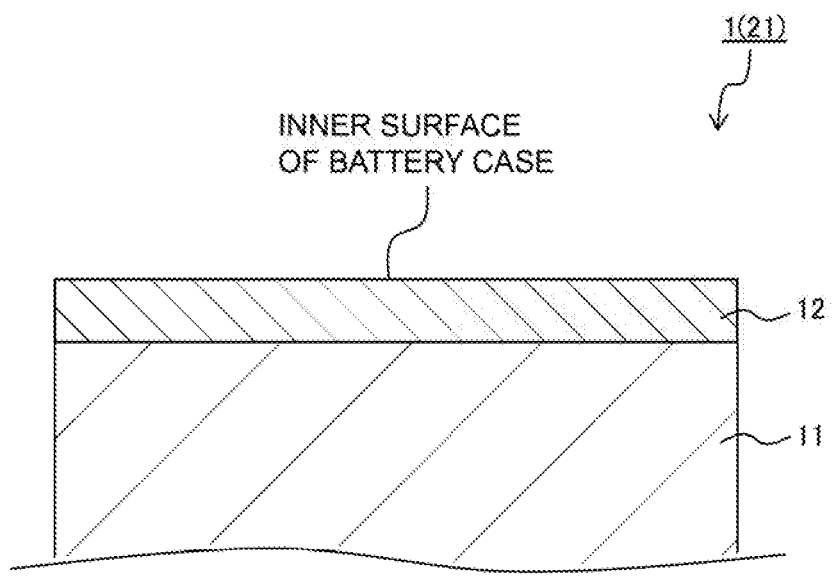
FIG. 3 is one embodiment of the surface-treated steel sheet according to the present invention and an enlarged cross-sectional view of a part III of FIG. 2.

FIG. 3 is an enlarged cross-sectional view of the part III of the positive electrode can 21 illustrated in FIG. 2, and in FIG. 3, the upper side thereof corresponds to the inner surface (surface contacting with the positive electrode mixture 23 of the alkaline battery 2) of the alkaline battery 2 of FIG. 1. The surface-treated steel sheet 1 according to the present embodiment has, as illustrated in FIG. 3, a nickel-cobalt-iron diffusion layer 12 formed on a steel sheet constituting a steel sheet 11 of the surface-treated steel sheet 1.

The surface-treated steel sheet 1 according to the present embodiment is a surface-treated steel sheet having the nickel-cobalt-iron diffusion layer 12 as an outermost surface layer famed on the steel sheet 11, wherein when a content of Ni, a content of Co and a content of Fe of the nickel-cobalt-iron diffusion layer are determined based on a Ni intensity, a Co intensity and a Fe intensity each sequentially measured in the depth direction from the surface side of the nickel-cobalt-iron diffusion layer by a radio frequency glow discharge optical emission spectrometry on the surface-treated steel sheet 1, the nickel-cobalt-iron diffusion layer 12 has a content of Co at a specific depth position D, $In_{Co\_D}$, of 5% by mass or higher and a content of Fe at the specific depth position D, $In_{Fe\_D}$, of 11% by mass or higher, the specific depth position D being a position where the Ni intensity is 0.5% of the maximum value of the Ni intensity in the nickel-cobalt-iron diffusion layer.

<Steel Sheet 11>

The steel sheet 11 according to the present embodiment is not especially limited as long as being excellent in forming workability, but there can be used, for example, low carbon aluminum-killed steels (carbon content: 0.01 to 0.15% by weight), extra-low carbon steels having a carbon content of lower than 0.01% by weight, or non-aging extra-low carbon steels made by adding Ti, Nb and the like to an extra-low carbon steel. In the present embodiment, there can also be used steel sheets obtained by hot rolling any of these steels, acid pickling the hot rolled steel to remove scales (oxide film) on the surface, cold rolling the pickled steel, electrolytically cleaning the cold rolled steel, and annealing and temper rolling the resultant steel; or steel sheets obtained by temper rolling the above described the pickled steel without cold rolling, annealing and temper rolling.

The thickness of the steel sheet 11 may suitably be selected according to applications of the surface-treated steel sheet, and is not especially limited. However, it is preferably 0.015 to 1.5 mm. In the case of a steel sheet (carbon steel or stainless steel) for batteries such as alkaline batteries and coin batteries, the thickness of the steel sheet 11 is preferably 0.15 to 0.6 mm; and particularly in the case of a steel sheet for alkaline battery cans, the thickness of the steel sheet 11 is preferably 0.15 to 0.5 mm. On the other hand, in applications requiring weight reduction and flexibility, the steel sheet 11 preferably has a foil shape with the thickness of 0.015 mm to 0.1 mm.

<Nickel-Cobalt-Iron Diffusion Layer 12>

Figure 4:
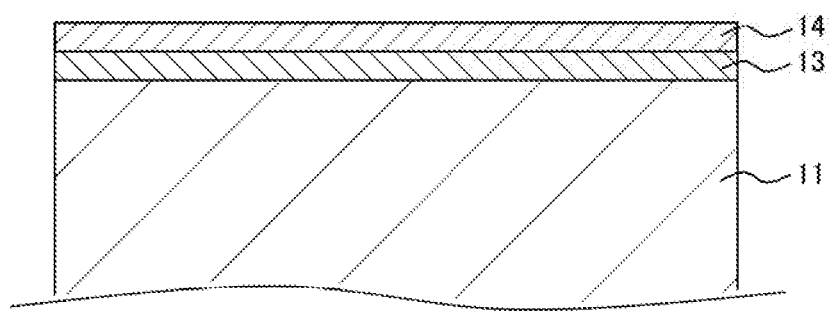
FIG. 4 is a view to interpret a method for manufacturing the surface-treated steel sheet illustrated in FIG. 3.

The surface-treated steel sheet 1 according to the present embodiment has the nickel-cobalt-iron diffusion layer 12 on the steel sheet 11. As illustrated in FIG. 4, as a method for forming the nickel-cobalt-iron diffusion layer 12 in the present embodiment, there can be used a method, for example, in which a nickel plating layer 13 and a nickel-cobalt alloy plating layer 14 are formed in this order on the surface of the steel sheet 11, and thereafter the resulting steel sheet is heat treated to thermally diffuse iron, nickel and cobalt contained in respective layers to thereby obtain the nickel-cobalt-iron diffusion layer 12.

In the nickel-cobalt-iron diffusion layer 12 of the surface-treated steel sheet 1 according to the present embodiment, the Co amount and the Fe amount in the surface are adjusted to respective specific amounts. Specifically, when the content of Ni, the content of Co and the content of Fe of the nickel-cobalt-iron diffusion layer are determined based respectively on the Ni intensity, Co intensity and Fe intensity each sequentially measured in the depth direction from the surface side of the nickel-cobalt-iron diffusion layer 12 toward the steel sheet 11 under a predetermined measurement condition by a radio frequency glow discharge optical emission spectrometry on the surface-treated steel sheet 1, the content of Co at a specific depth position D, $In_{Co\_D}$, is 5% by mass or higher, and the content of Fe at the specific depth position D, $In_{Fe\_D}$, is 11% by mass or higher, the specific depth position D being a position where the Ni intensity is 0.5% of the maximum value of the Ni intensity in the nickel-cobalt-iron diffusion layer. Here, the content of Ni, content of Co and content of Fe determined by the radio frequency glow discharge optical emission spectrometry indicate a content of Ni, content of Co and content of Fe with respect to a total content of Ni, Co and Fe, respectively.

Here, determination procedures of the content of Co, $In_{Co\_D}$, and the content of Fe, $In_{Fe\_D}$, will be described by reference to FIG. 5(A) to FIG. 5(D).

Figure 5:
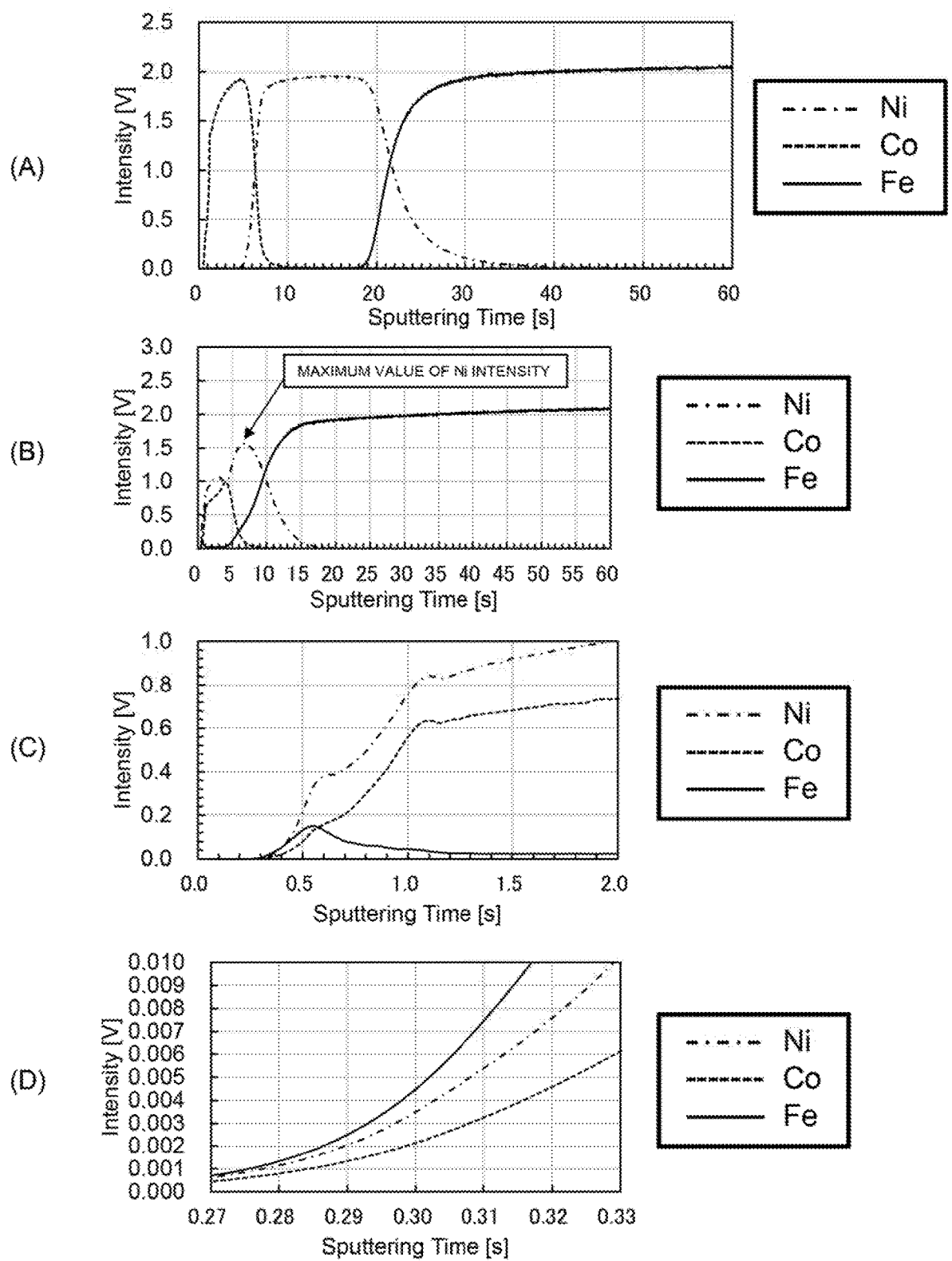
FIG. 5 is graphs to interpret a method for determining the content of Co, $In_{Co\_D}$, and the content of Fe, $In_{Fe\_D}$.

First, in order to set the measurement condition for the measurement by the radio frequency glow discharge optical emission spectrometry, a sample for adjusting the measurement condition (sample prepared by forming a nickel plating layer and a cobalt plating layer in this order on a steel sheet) is prepared. Then, the measurement on the prepared sample for adjusting the measurement condition is carried out from the surface of the cobalt plating layer toward the steel sheet under a condition such that the maximums of the Ni intensity, Co intensity and Fe intensity (the Ni intensity in the region where Ni as a simple element is detected in the nickel plating layer, the Co intensity in the region where Co as a simple element is detected in the cobalt plating layer and the Fe intensity in the region where Fe as a single element is detected in the steel sheet) obtained by a radio frequency glow discharge optical emission spectrometer are nearly equal. One example of measurement results is shown in FIG. 5(A). In FIG. 5(A), the ordinate indicates the intensity, and the abscissa indicates the measuring time when the measurement is carried out in the depth direction by the radio frequency glow discharge optical emission spectrometer while sputtering by Ar plasma is carried out from the surface of the surface-treated steel sheet 1. Here, as a method of adjusting the maximums of the Ni intensity, the Co intensity and the Fe intensity to nearly equal values, there can be used a method in which the voltage (H.V.) of the photomultiplier channel of the radio frequency glow discharge optical emission spectrometer is tailor for each element to be measured.

Here, since nickel, cobalt and iron have nearly equal sputtering rates by Ar plasma. Thus, when each single material of nickel, cobalt and iron is subjected to a measurement by the radio frequency glow discharge optical emission spectrometer under the same condition of sputtering (Ar gas pressure (unit: Pa)) and output (unit: W)), the amount of the each single material to be etched is nearly equal; therefore, the amount of nickel etched contributing to the Ni intensity to be measured, the amount of cobalt etched contributing to the Co intensity to be measured and the amount of iron etched contributing to the Fe intensity to be measured are nearly equal.

Hence, as seen in the above-mentioned FIG. 5(A), by carrying out the measurement by the radio frequency glow discharge optical emission spectrometer under the condition that the maximum values of the Ni intensity, the Co intensity and the Fe intensity are nearly the same values (in the example shown in FIG. 5(A), the intensities are about 2.0 V), a ratio obtained from the value of the Ni intensity, Co intensity and Fe intensity obtained can be converted as it is to a ratio of masses of Ni, Co and Fe. For example, the ratio of the Fe intensity to the total of the Ni intensity, the Co intensity and the Fe intensity as it is can be taken as the ratio of the mass of Fe to the total of the masses of Ni, Co and Fe (content of Fe); and this applies to Ni and Co as well. In the present embodiment, by thus previously setting the measurement condition (voltage of the photomultiplier channel) for the radio frequency glow discharge optical emission spectrometer and carrying out the measurement on the surface-treated steel sheet 1 under the set condition, the content of Ni, the content of Co and the content of Fe with respect to the total content of Ni, Co and Fe at each depth position (depth position determined from the measuring time in the measurement under sputtering) are enabled to be determined from the Ni intensity, Co intensity and Fe intensity obtained.

Here, with regard to the measurement condition by the radio frequency glow discharge optical emission spectrometer, the maximum values of the Ni intensity, the Co intensity and the Fe intensity are adjusted to about 2.0 V in the example shown in the above-mentioned FIG. 5(A), but the maximum values are not limited to 2.0 V, and can be made to be arbitral values. However, when the value is too low, the measuring sensitivity may be lowered, and on the other hand, when the value is too high, there is a risk that a saturated intensity is obtained and an accurate value cannot be obtained. Thus, an H.V. is set such that an enough maximum value of the intensity to make no saturation nor sensitivity deficiency can be obtained when a measurement is carried out on the above sample for adjusting the measurement condition. Usually, the value falls in the range of ±1.0 V of a value measured at an H.V. recommended or aimed by the measuring apparatus. In measurements in Examples described later, there was used the maximum value of the Ni intensity in the measurement in which the H.V. of Ni was set at 630 V. Then, it is preferable that the each thickness of the nickel plating layer and the cobalt plating layer of the sample for adjusting the measurement condition be 0.2 to 1.0 μm, in order to obtain enough intensities.

Then, by setting the measurement condition of the radio frequency glow discharge optical emission spectrometer as indicated in FIG. 5(A), and thereafter carrying out the measurement on the surface-treated steel sheet 1 according to the present embodiment under the set condition, the content of Ni, the content of Co and the content of Fe in the nickel-cobalt-iron diffusion layer 12 can be determined.

Here, FIG. 5(B) is graphs, which shows the Ni intensity, the Co intensity and the Fe intensity sequentially measured in the depth direction from the surface side of the nickel-cobalt-iron diffusion layer 12 toward the steel sheet 11 under the above measurement condition by the radio frequency glow discharge optical emission spectrometry on the surface-treated steel sheet 1 of Example 1 described later. Then, FIG. 5(C) is enlarged graphs by varying the scales of the abscissa and the coordinate, which corresponds to part of the graphs of FIG. 5(B); and FIG. 5(D) is further enlarged graphs, which correspond to part the graphs of FIG. 5(C).

Since the graphs of FIG. 5(B), FIG. 5(C) and FIG. 5(D) indicate measurement results under the above measurement condition, the Ni intensity, the Co intensity and the Fe intensity as they are can be converted to masses of Ni, Co and Fe.

Then, in the present embodiment, the content of Co at a specific depth position D, $In_{Co\_D}$, and the content of Fe at the specific depth position D, $In_{Fe\_D}$, are determined based on such graphs of the Ni intensity, the Co intensity and the Fe intensity, and the specific depth position D is a position where the Ni intensity in the nickel-cobalt-iron diffusion layer 12 is 0.5% of the maximum value thereof.

First, as indicated in FIG. 5(B), in a surface layer portion (region of a sputtering time of 0 to about 10 sec) of the surface-treated steel sheet 1 according to the present embodiment, the nickel-cobalt-iron diffusion layer 12, in which Ni, Co and Fe are concurrently present is present. As described above, the nickel-cobalt-iron diffusion layer 12 can be formed for example, by forming a nickel plating layer and a nickel-cobalt alloy plating layer in this order on the surface of the steel sheet 11, and heat treating the resultant under a specific condition, wherein iron in the steel sheet 11 thermally diffuses to the outermost surface by the heat treatment. In the present embodiment, for such a nickel-cobalt-iron diffusion layer 12, the maximum value of the Ni intensity is extracted and the depth position where the Ni intensity is 0.5% of the extracted maximum value thereof is specified as the specific depth position D. Here, in the case where a plurality of depth positions where the Ni intensity is 0.5% of the maximum value thereof are present, a position nearest to the surface of the nickel-cobalt-iron diffusion layer 12 among them is specified as the specific depth position D. Specifically, in the graph in FIG. 5(B), the maximum value of the Ni intensity is found near a sputtering time of about 6.7 sec, and the intensity thereof is about 1.57 V. Hence, the intensity of 0.5% of the maximum value (1.57 V) of the Ni intensity is 0.0078 V, and from the graph in FIG. 5(D), the specific depth position D where the Ni intensity is 0.0078 V can be specified to be a depth position near a sputtering time of about 0.32 sec. In Example 1 shown in FIG. 5(B) to FIG. 5(D), however, since the data fetching interval in the measurement was set actually at 0.05 sec, a depth position giving an intensity nearest the intensity of 0.5% was determined to be the specific depth position D where the intensity is 0.5% of the maximum value of the Ni intensity (in Example 1 shown in FIG. 5(D), a sputtering time of 0.3 sec gave the nearest value), but in studies by the present inventors, the proportion of the intensity of each element at 0.3 sec and that at 0.32 sec were the same. In the present embodiment, the proportion of the Co intensity at the specific depth position D to the total of the Ni intensity, the Co intensity and the Fe intensity thereat is determined as the content of Co, $In_{Co\_D}$ (unit: % by mass). Similarly, the proportion of the Fe intensity at the specific depth position D to the total of the Ni intensity, the Co intensity and the Fe intensity thereat is determined as the content of Fe, In (unit: % by mass). Then, in the present embodiment, the reason that the content of Co, $In_{Co\_D}$, and the content of Fe, $In_{Fe\_D}$, at the specific depth position D are controlled is that it can be seen that these content of Co and content of Fe at the specific depth position D represent a content of Co and a content of Fe respectively in the surface layer (the outermost surface layer or the vicinity of the outermost surface layer) of the nickel-cobalt-iron diffusion layer 12. In short, the content of Co and the content of Fe in the outermost surface of the nickel-cobalt-iron diffusion layer 12 are substantially controlled in the present embodiment.

Then, in the measurement by the radio frequency glow discharge optical emission spectrometer, the hardness of the measurement object affects the sputtering rate (and sputtering time). In particular, the deeper the depth from the outermost surface layer to a measuring point is, the more the intensity to be measured may be affected by the depth (depth from the outermost surface layer to the measuring point). Therefore, for the surface-treated steel sheet 1 according to the present embodiment, the measurement under the measurement condition set by the above-mentioned method as shown in FIG. 5(A) is started, and the intensity ratio of each element in each measuring point (each depth position) is determined as a content of the each element. Even if the measurement is carried out under the same sputtering condition at the same H.V., there are cases where overall intensity values vary depending on the state of the anode; for example, in the above-mentioned example shown in FIG. 5(A), although the measurement condition is adjusted so that the maximum value of the intensity is about 2.0 V, there are cases where the maximum value of the intensity is not 2.0 V when the nickel-cobalt-iron diffusion layer 12 of the surface-treated steel sheet 1 actually fabricated is measured; however, since the intensity ratio of each element at each measuring point is determined as a content of the each element as described above, no problem arises.

In the surface-treated steel sheet 1 according to the present embodiment, the nickel-cobalt-iron diffusion layer 12 is formed in which the above-mentioned content of Co, $In_{Co\_D}$, is 5% by mass or higher, and the above-mentioned content of Fe, $In_{Fe\_D}$, is 11% by mass or higher. Accordingly, in the case where the surface-treated steel sheet 1 is made into a battery case so that the nickel-cobalt-iron diffusion layer 12 corresponds to the inner surface, a battery to be obtained is low in the internal resistance value, which leads to excellent battery characteristics, and also has excellent corrosion resistance to an electrolyte solution, which leads to suppression of impairing the battery characteristics also after a lapse of time.

It is conventionally known that: when a surface-treated steel sheet for battery cases having an iron-nickel diffusion layer formed on the surface thereof is made into a battery case so that the iron-nickel diffusion layer corresponds to the inner surface of the battery case to thereby expose iron on the inner surface of the battery case, the obtained battery is excellent in battery characteristics, compared with the case where no iron is exposed. However, when the amount of iron exposed on the inner surface of the battery case is too large, there is a risk that the following trouble arises: the proportion of nickel present in the inner surface of the battery case reduces along with the increase of iron; then, in the case where the battery is stored or used over a long period, iron dissolves out into the electrolyte solution and the internal pressure of the battery is raised by gases generated due to the dissolving-out of iron; and the rise of the internal pressure causes leakage of the electrolyte solution through a sealing part. Further, due to the reduction of the proportion of nickel present in the inner surface of the battery case, there also arises a risk that in the case of storing the sheet before forming into the battery case, or storing the sheet in the form of a the battery case, the rustproofness thereof against air reduces.

It is also conventionally known a method in which a surface-treated steel sheet for battery cases having a nickel-cobalt alloy layer formed on the surface thereof is made into a battery case so that the nickel-cobalt alloy layer corresponds to the inner surface of the battery case. It is known that by increasing the content of cobalt in the nickel-cobalt alloy layer, the battery characteristics are improved in this case. However, when the content of cobalt in the nickel-cobalt alloy layer is increased, it is easy for cobalt to dissolve out from the inner surface of the battery case simply due to the increase of the content of cobalt in the nickel-cobalt alloy layer; and also, since the content of nickel reduces along with the increase of the content of cobalt, the amount of cobalt alloyed with nickel increases, which disadvantageously makes easy for cobalt to dissolve out.

In short, it is conventionally known that by forming an iron-nickel diffusion layer or a nickel-cobalt alloy layer as the inner surface of a battery case and increasing the content of iron or cobalt in these layers, the battery characteristics of the battery to be obtained can be improved. However, problems of these cases are that the rustproofness and the corrosion resistance to an electrolyte solution are reduced since the content of nickel reduces along with the incorporation of iron or cobalt.

By contrast, according to the present embodiment, the above-mentioned nickel-cobalt-iron diffusion layer 12, specifically, the nickel-cobalt-iron diffusion layer 12 concurrently including three elements of nickel, cobalt and iron in which the Co amount and the Fe amount in the surface are adjusted to specific amounts is formed in the surface-treated steel sheet 1. Owing to this, even in the case where the content of nickel, which contributes to improve the rustproofness and the corrosion resistance to an electrolyte solution, is relatively low, there is secured the improving effect on the battery characteristics by iron suitably exposed on the inner surface of the battery case while the corrosion resistance to the electrolyte solution can be excellent, and impairing the battery characteristics can also be suppressed even after lapse of time.

The content of Co, $In_{Co\_D}$, in the nickel-cobalt-iron diffusion layer 12 is 5% by mass or higher, and in view of more improving the battery characteristics after lapse of time, it is preferably 12% by mass or higher, more preferably 16% by mass or higher and still more preferably 20% by mass or higher. When the content of Co, $In_{Co\_D}$, is too low, the effect of improving the battery characteristics of a battery to be obtained cannot be exhibited. The upper limit of the content of Co, $In_{Co\_D}$ is preferably 65% by mass or lower, more preferably 55% by mass or lower, still more preferably 39% by mass or lower and especially preferably 30% by mass or lower, in view of suppressing dissolving-out of cobalt to thereby suppress the reduction of the corrosion resistance when using the surface-treated steel sheet 1 as the battery case.

The content of Fe, $In_{Fe\_D}$, in the nickel-cobalt-iron diffusion layer 12 is 11% by mass or higher, and is preferably 13% by mass or higher, more preferably 18% by mass or higher and still more preferably 20% by mass or higher. When the content of Fe, $In_{Fe\_D}$, is too low, the effect of improving the battery characteristics of a battery to be obtained is insufficient. The upper limit of the content of Fe, $In_{Fe\_D}$, is preferably 80% by mass or lower, more preferably 70% by mass or lower, still more preferably 63% by mass or lower and especially preferably 53% by mass or lower in view of suppressing dissolving-out of iron to thereby suppress the reduction of the corrosion resistance when using the surface-treated steel sheet 1 as the battery case.

Further in the surface-treated steel sheet 1 according to the present embodiment, it is preferable that not only the content of Co, $In_{Co\_D}$, and the content of Fe, $In_{Fe\_D}$, but also the content of Ni at the specific depth position D, $In_{Ni\_D}$, be controlled. Specifically, the proportion of the nickel intensity to the total of the Ni intensity, the Co intensity and the Fe intensity at the specific depth position D where the Ni intensity in the nickel-cobalt-iron diffusion layer 12 is 0.5% of the maximum value of the Ni intensity is determined as the content of Ni, $In_{Ni\_D}$, (unit: % by mass), and the content of Ni, $In_{Ni\_D}$, is preferably 5% by mass or higher and more preferably 7% by mass or higher, for improvement of corrosion resistance and rustproofness. the content of Ni, $In_{Ni\_D}$, is still more preferably 10% by mass or higher and especially preferably 12% by mass or higher, in view of more suppressing dissolving-out of cobalt and iron when the surface-treated steel sheet 1 as the battery case. In the case of using the surface-treated steel sheet 1 as the battery case, the upper limit of the content of Ni, $In_{Ni\_D}$ is preferably 70% by mass or lower, more preferably 60% by mass or lower, still more preferably 50% by mass or lower, further still more preferably 48% by mass or lower and especially preferably 47% by mass or lower, in view of suppressing the increase of the contact resistance and improving the battery characteristics when using the surface-treated steel sheet 1 as the battery case. When the content of Ni, $In_{Ni\_D}$, is in the above range, the corrosion resistance when using the surface-treated steel sheet 1 as the battery case is more improved.

Further in the surface-treated steel sheet 1 according to the present embodiment, the lower limit of the ratio of the content of Fe, $In_{Fe\_D}$, to the content of Co, $In_{Co\_D}$, $R_{Fe/Co}$ ($In_{Fe\_D}/In_{Co\_D}$) is preferably 0.5 or higher, more preferably 0.8 or higher and still more preferably 1.0 or higher; and the upper limit of the ratio $R_{Fe/Co}$ is preferably 20 or lower, more preferably 12 or lower and still more preferably 2.9 or lower. When the ratio $R_{Fe/Co}$ is in the above range, the effect of improving the battery characteristics of a battery to be obtained and the effect of improving the corrosion resistance to an electrolyte solution can be more highly balanced.

The content of Fe is preferably 55% by mass or higher and more preferably 65% by mass or higher, in view of more improving the initial battery characteristics. In this case, in order to suppress the dissolving-out to the electrolyte solution, it is additionally preferable that the content of Co be 5% by mass or higher; it is preferable that the content of cobalt in the nickel-cobalt-iron diffusion layer 12 described later be 0.2 g/m² or higher; and it is also preferable that the total content of nickel and cobalt in the nickel-cobalt-iron diffusion layer 12 be 3.5 g/m² or higher. The cobalt content in the nickel-cobalt-iron diffusion layer 12 is more preferably 0.5 g/m² or higher and still more preferably 0.7 g/m² or higher, in view of improving the battery characteristics after lapse of time. When the cobalt content is the above value, the battery characteristics after lapse of time can be excellent due to not only the content of Co in the surface layer but also the incorporation of cobalt in a certain amount in the diffusion layer.

Figure 6:
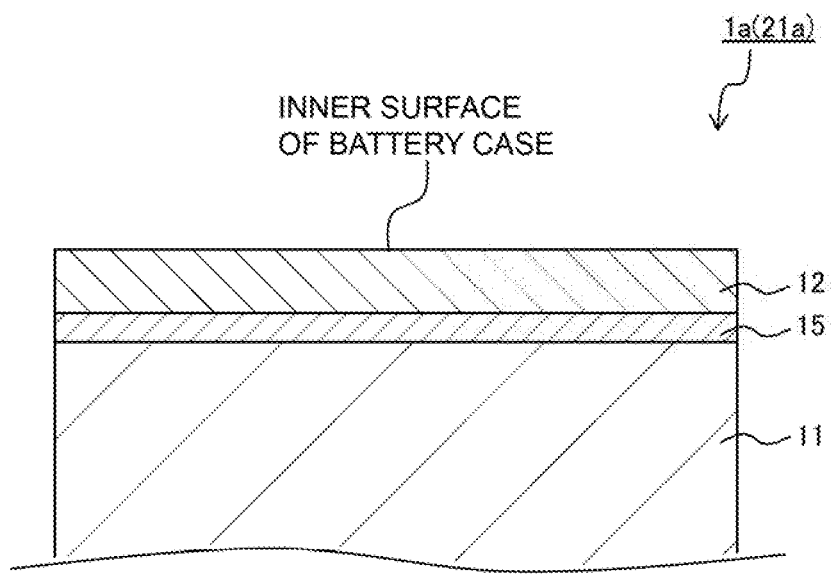
FIG. 6 is a cross-sectional view of a second embodiment of the surface-treated steel sheet according to the present invention.

In the present embodiment, an iron-nickel diffusion layer 15 may further be provided between the steel sheet 11 and the nickel-cobalt-iron diffusion layer 12, as in a surface-treated steel sheet 1a illustrated in FIG. 6. In the case of using such a surface-treated steel sheet 1a as the battery case, the corrosion resistance to the electrolyte solution can be more improved.

Here, for the surface-treated steel sheet 1a according to the present embodiment, the presence of the iron-nickel diffusion layer 15 can be confirmed by the following method. Specifically, the Ni intensity, $In_{Ni}$, the Co intensity, $In_{Co}$, and the Fe intensity, $In_{Fe}$, are sequentially measured in the depth direction from the surface of the nickel-cobalt-iron diffusion layer 12 toward the steel sheet 11 by the radio frequency glow discharge optical emission spectrometry on the surface-treated steel sheet 1a using the same method as in the above-mentioned FIG. 5(B). At this time, when there is present a region from a starting depth point where the Co intensity, $In_{Co}$, measured in the depth direction from the surface of the nickel-cobalt-iron diffusion layer 12, after exhibiting its maximum value, becomes an intensity of 15% of the maximum value to a depth point where the Ni intensity, $In_{Ni}$, measured in the depth direction from the surface of the nickel-cobalt-iron diffusion layer 12, after exhibiting its maximum value, becomes an intensity of 15% of the maximum value, such a depth region can be judged to be a diffusion layer composed of iron and nickel without cobalt, that is, an iron-nickel diffusion layer; in this case, it can be judged that the iron-nickel diffusion layer is present. Here, in the measurement by a radio frequency glow discharge optical emission spectrometer, information of elements from side walls at an etched spot becomes liable to be given along with progress of the etching and the elements present in the surface layer are liable to be detected as noises. Accordingly, in the case where the intensity of the each element is 15% or lower of the maximum value thereof at depths other than and much deeper than the surface layer and the vicinity of the surface layer, the element can usually be considered to be almost absent.

In the present embodiment, the lower limit of the content of cobalt in the nickel-cobalt-iron diffusion layer 12 is preferably 0.2 $g/m^2$ or higher, and in view of more improving the battery characteristics, it is more preferably 0.5 $g/m^2$ or higher and still more preferably 0.7 $g/m^2$ or higher. The upper limit of the content of cobalt is preferably 5.0 $g/m^2$ or lower, more preferably 3.0 $g/m^2$ or lower and still more preferably 2.0 $g/m^2$ or lower, in view of suppressing excessive dissolving-out of cobalt from the diffusion layer.

In the case of forming the iron-nickel diffusion layer 15, the lower limit of the total content of nickel contained in the nickel-cobalt-iron diffusion layer 12 and the iron-nickel diffusion layer 15 is preferably 1.0 $g/m^2$ or higher, more preferably 1.3 $g/m^2$ or higher and still more preferably 1.6 $g/m^2$ or higher, in view of improving the corrosion resistance. The upper limit of the total content of nickel contained in the nickel-cobalt-iron diffusion layer 12 and the iron-nickel diffusion layer 15 is preferably 11.3 $g/m^2$ or lower, more preferably 9.5 $g/m^2$ or lower, still more preferably 8.5 $g/m^2$ or lower and especially preferably 7.0 $g/m^2$ or lower, because too high a content thereof cause risks that the iron exposure is difficult and that stable proportions cannot be given.

In the case of forming no iron-nickel diffusion layer 15, the lower limit of the content of nickel in the nickel-cobalt-iron diffusion layer 12 is preferably 0.2 $g/m^2$ or higher, more preferably 0.5 $g/m^2$ or higher and still more preferably 0.7 $g/m^2$ or higher, in view of improving the corrosion resistance. In the case of forming no iron-nickel diffusion layer 15, the upper limit of the content of nickel in the nickel-cobalt-iron diffusion layer 12 is preferably 11.3 $g/m^2$ or lower, more preferably 9.5 $g/m^2$ or lower, still more preferably 8.5 $g/m^2$ or h lower and especially preferably 7.0 $g/m^2$ or lower, because too high a content thereof cause risks that the iron exposure is difficult and that stable proportions cannot be given.

The lower limit of the total content of nickel and cobalt in the nickel-cobalt-iron diffusion layer 12 (in the case where the iron-nickel diffusion layer 15 is formed, the total content of nickel and cobalt contained in the nickel-cobalt-iron diffusion layer 12 and the iron-nickel diffusion layer 15) is preferably 1.6 $g/m^2$ or higher, more preferably 2.5 $g/m^2$ or higher, still more preferably 3.0 $g/m^2$ or higher and especially preferably 3.5 $g/m^2$ or higher, in view of suppressing dissolving-out from the base steel. The upper limit of the total content of nickel and cobalt is preferably 11.5 $g/m^2$ or lower, more preferably 10.0 $g/m^2$ or lower, still more preferably 9.0 $g/m^2$ or lower and especially preferably 7.5 $g/m^2$ or lower, because too high a content thereof cause risks that the iron exposure is difficult and that stable proportions cannot be given.

The above-mentioned nickel content and cobalt content can be determined by carrying out X-ray fluorescence analysis on the surface-treated steel sheet 1, 1a and measuring amounts of nickel and cobalt deposited.

Here, in the above measurement of the amounts deposited, although semi-quantitative analysis by the X-ray fluorescence analysis can be carried out, the X-ray penetration depth is 10 μm or deeper in such analysis. Thus, in the case where the amount of the nickel-cobalt-iron diffusion layer 12 is in 11.5 $g/m^2$ or lower, the proportions end up including iron in the base steel even if the measurement is carried out from the outermost surface layer. For example, when a surface-treated steel sheet of Example 1 described later (which had a content of Ni, $In_{Ni\_D}$, of 34.55, a content of Co, $In_{Co\_D}$, of 21.16 and a content of Fe, $In_{Fe\_D}$, of 44.29 as values determined by radio frequency glow discharge optical emission spectrometry) was subjected to X-ray fluorescence analysis, the proportions of nickel, cobalt and iron were 14.00% by mass, 6.08% by mass and 79.90% by mass, respectively; the measurement result by the X-ray fluorescence analysis was thus different from the measurement result of the radio frequency glow discharge optical emission spectrometry. Further also in other Examples described later, the proportion of nickel was 10 to 40% by mass; the proportion of cobalt was 3.5 to 9% by mass; and the proportion of iron was 55 to 85% by mass. Therefore, in particular, in the case where iron is exposed on the surface layer, the proportions calculated from amounts of plating deposited or the results of the X-ray fluorescence analysis are different from the proportions in the surface layer (outermost surface layer and the vicinity of the outermost surface layer) analyzed by the radio frequency glow discharge optical emission spectrometry. By contrast, the radio frequency glow discharge optical emission spectrometry can suitably analyze the proportions in the surface layer (outermost surface layer and the vicinity of the outermost surface layer).

The surface-treated steel sheet 1, 1a according to the present embodiment is as described above.

For use, the surface-treated steel sheet 1, 1a according to the present embodiment is formed into a positive electrode can 21 of an alkaline battery 2 illustrated in FIGS. 1 and 2 and battery cases of other batteries by a deep drawing process, a drawing and ironing process (DI work process), a drawing and thin-redrawing process (DTR work process), a combined work process of stretching work and ironing work after drawing work, or the like so that the nickel-cobalt-iron diffusion layer 12 corresponds to the inner surface side of the case.

In the case where the battery case according to the present embodiment is used to make a battery, the battery can be low in the internal resistance value, which leads to excellent battery characteristics, and also excellent in the corrosion resistance to a strong alkaline electrolyte solution, and can suppress impairing the battery characteristics even after lapse of time, since the battery case is made of the above-mentioned surface-treated steel sheet 1, 1a according to the present embodiment; thus, the battery case can suitably be used as battery cases of batteries using a strong alkaline electrolyte solution. Examples in which the surface-treated steel sheet 1, 1a according to the present embodiment is used as a member for an alkaline battery are mentioned above; however, usage thereof is not limited to alkaline batteries, and the surface-treated steel sheet 1, 1a according to the present embodiment can suitably be used as battery cases of batteries using a strong alkaline electrolyte solution. The surface-treated steel sheet 1, 1a according to the present embodiment can suitably be used particularly as battery cases of batteries having a mechanism of releasing gases generated in the interior of the batteries. This is because in the case of having such a gas releasing mechanism, generated gases can suitably be released even if cobalt and iron dissolve out in extremely trace amounts from the nickel-cobalt-iron diffusion layer 12 famed on the inner surface side of the battery case according to the present embodiment to thereby generate gases in trace amounts.

Method for Manufacturing the Surface-Treated Steel Sheet>

Then, a method for manufacturing the surface-treated steel sheet 1 according to the present embodiment will be described.

First, a steel sheet 11 is provided, and nickel plating is carried out on the steel sheet 11 to thereby form, as illustrated in FIG. 4, a nickel plating layer 13 on the surface which is to be the inner surface of a battery case of the steel sheet 11. Here, it is preferable that the nickel plating layer 13 be formed not only on the surface which is to be the inner surface of the battery case of the steel sheet 11, but also on the back surface of the steel sheet 11. When the nickel plating layers 13 are formed on both surfaces of the steel sheet 11, plating baths having different compositions may be used for the surface of the steel sheet 11 which is to be the inner surface of a battery case and that to be the outer surface of the battery case, respectively, to form nickel plating layers 13 having different compositions, surface roughnesses and other properties; however, it is preferable that the nickel plating layers 13 be formed on both surfaces of the steel sheet 11 in a single step using the same plating bath, in view of improving the manufacturing efficiency.

The nickel plating bath for forming the nickel plating layer 13 is not especially limited, but there can be used plating baths usually used in nickel plating, such as Watts bath, sulfamine bath, fluoroboride bath, chloride bath, and citric acid bath. The nickel plating layer 13 can be formed, for example, by using a Watts bath having a bath composition of 200 to 350 g/L of nickel sulfate, 20 to 60 g/L of nickel chloride and 10 to 50 g/L of boric acid under the conditions of a pH of 3.0 to 4.8 (preferably 3.6 to 4.6), a bath temperature of 50 to 70° C. and a current density of 0.5 to 60 A/dm² (preferably 1 to 40 A/dm²).

The content of nickel in the nickel plating layer 13 may be lower than 11.0 g/m², and is preferably 10.0 g/m² or lower and more preferably 9.0 g/m² or lower. Here, the content of nickel can be determined by carrying out X-ray fluorescence analysis on the steel sheet 11 having the nickel plating layer 13 formed thereon and measuring the amount of nickel atoms deposited forming the nickel plating layer 13. The lower limit of the content of nickel in the nickel plating layer 13 is not especially limited, but is preferably 0.2 g/m² or higher, more preferably 0.4 g/m² or higher, still more preferably 0.8 g/m² or higher and further still more preferably 1.2 g/m² or higher, and in view of enhancing the corrosion resistance, especially preferably 1.6 g/m² or higher. When a nickel-cobalt-iron diffusion layer 12 is formed by forming a nickel-cobalt alloy plating layer 14 on the nickel plating layer 13 and heat treating the resultant as described later, iron in the steel sheet 11 is enabled to thermally diffuse successfully through the nickel plating layer 13 to the surface of the nickel-cobalt alloy plating layer 14 by the heat treatment and the nickel-cobalt-iron diffusion layer 12 can be successfully formed, if the content of nickel in the nickel plating layer 13 is in the above range.

Then, on the steel sheet 11 having the nickel plating layer 13 formed thereon, nickel-cobalt alloy plating is carried out to thereby form the nickel-cobalt alloy plating layer 14.

A nickel-cobalt alloy plating bath for forming the nickel-cobalt alloy plating layer 14 is not especially limited, but it is preferable to use a plating bath having, as a base, a Watts bath containing nickel sulfate, nickel chloride, cobalt sulfate and boric acid. Here, the cobalt/nickel ratio in the nickel-cobalt alloy plating bath is preferably in the range of 0.05 to 1.0 and more preferably in the range of 0.1 to 0.7, in terms of a molar ratio of cobalt/nickel. For example, in the case of using a plating bath having, as a base, a Watts bath containing nickel sulfate, nickel chloride, cobalt sulfate and boric acid, a plating bath can be used which is prepared by suitably adjusting the contents of the respective components in the ranges of nickel sulfate: 10 to 300 g/L, nickel chloride: 20 to 60 g/L, cobalt sulfate: 10 to 250 g/L and boric acid: 10 to 40 g/L and also in the above range of the cobalt/nickel ratio. It is preferable that the nickel-cobalt alloy plating be carried out under the conditions of a bath temperature of 40 to 80° C., a pH of 1.5 to 5.0 and a current density of 1 to 40 A/dm².

The total content of nickel and cobalt in the nickel-cobalt alloy plating layer 14 may be 7.5 g/m² or lower, and is preferably 4.0 g/m² or lower and more preferably 3.0 g/m² or lower. Here, the content of nickel and cobalt in the nickel-cobalt alloy plating layer 14 can be determined by carrying out X-ray fluorescence analysis on the steel sheet 11 having the nickel plating layer 13 and the nickel-cobalt alloy plating layer 14 formed thereon, measuring the total amount of nickel atoms and cobalt atoms deposited forming the nickel plating layer 13 and the nickel-cobalt alloy plating layer 14, and subtracting the above-mentioned content of nickel in the nickel plating layer 13 from the obtained total amount deposited (or, subtracting the amount of nickel deposited in the formation of the nickel plating layer 13). The lower limit of the total content of nickel and cobalt in the nickel-cobalt alloy plating layer 14 is not especially limited, but is preferably 0.4 g/m² or higher, more preferably 0.8 g/m² or higher, still more preferably 1.2 g/m² or higher and especially preferably 1.6 g/m² or higher. When a heat treatment as described later is carried out on the steel sheet 11 having the nickel plating layer 13 and the nickel-cobalt alloy plating layer 14 formed thereon, iron in the steel sheet 11 is enabled to thermally diffuse successfully through the nickel plating layer 13 to the surface of the nickel-cobalt alloy plating layer 14 by the heat treatment and the nickel-cobalt-iron diffusion layer 12 can be successfully famed, if the total content of nickel and cobalt in the nickel-cobalt alloy plating layer 14 is in the above range.

The content of cobalt in the nickel-cobalt alloy plating layer 14 is preferably 0.2 g/m$^2$ or higher, and in order to more improve the battery characteristics of an obtained battery, it is more preferably 0.5 g/m$^2$ or higher and still more preferably 0.7 g/m$^2$ or higher. The upper limit of the content of cobalt is not especially limited as long as not in conflict with making the content in the surface layer in the predetermined range. When the content of cobalt is high to result in too large a plating thickness, there arises a risk that iron is hardly exposed, and therefore the upper limit is preferably 5.0 g/m$^2$ or lower, more preferably 3.0 g/m$^2$ or lower and still more preferably 2.0 g/m$^2$ or lower. Here, the content of cobalt can be determined by carrying out X-ray fluorescence analysis on the steel sheet 11 having the nickel plating layer 13 and the nickel-cobalt alloy plating layer 14 formed thereon and measuring the amount of cobalt atoms deposited forming the nickel-cobalt alloy plating layer 14. In the case of using the surface-treated steel sheet 1 as the battery case, the battery characteristics of an obtained battery can be more improved when the content of cobalt in the nickel-cobalt alloy plating layer 14 is in the above range.

Then, by carrying out the heat treatment on the steel sheet 11 having the nickel plating layer 13 and the nickel-cobalt alloy plating layer 14 formed thereon, iron in the steel sheet 11, nickel in the nickel plating layer 13 and nickel and cobalt in the nickel-cobalt alloy plating layer 14 are caused to mutually thermally diffuse to thereby form the nickel-cobalt-iron diffusion layer 12. Thereby, as illustrated in FIG. 3, there is provided the surface-treated steel sheet 1 having the nickel-cobalt-iron diffusion layer 12 foiled on the steel sheet 11. Alternatively, depending on the content of nickel in the nickel plating layer 13, the total content of nickel and cobalt in the nickel-cobalt alloy plating layer 14, the heat treatment condition, and other conditions, there is provided the surface-treated steel sheet 1a having the iron-nickel diffusion layer 15 formed between the steel sheet 11 and the nickel-cobalt-iron diffusion layer 12, as illustrated in FIG. 6.

The heat treatment condition may suitably be selected according to the content of nickel in the nickel plating layer 13, the total content of nickel and cobalt in the nickel-cobalt alloy plating layer 14. The heat treatment temperature may be 480 to 900° C., and is preferably 500 to 800° C. and more preferably 520 to 750° C. Then the uniform heating time (time in which the above heat treatment temperature is held) in the heat treatment is preferably 3 sec to 2 min, more preferably 10 sec to 1.5 min and still more preferably 20 to 60 sec. A method of the thermal diffusion treatment may be either of continuous annealing and batch annealing, but is preferably continuous annealing, in which the heat treatment temperature and the heat treatment time can easily be adjusted in the above ranges. When the content of nickel and cobalt is 11.5 g/m$^2$ or lower, the method is more preferably continuous annealing at a heat treatment temperature of 600 to 900° C. and still more preferably continuous annealing at a heat treatment temperature of 700 to 830° C., in view of more securely exposing iron. When the content of nickel and cobalt is 5.4 g/m$^2$ or lower, the method may also be continuous annealing at a heat treatment temperature of 480° C. or higher and lower than 600° C.

The surface-treated steel sheet 1, 1a according to the present embodiment can be manufactured as in the above.

According to the manufacturing method of the present embodiment, by controlling the content of nickel in the nickel plating layer 13, the total content of nickel and cobalt in the nickel-cobalt alloy plating layer 14, and the heat treatment condition in the respective above ranges, the nickel-cobalt-iron diffusion layer 12 can be made in which the content proportion of Co, $In_{Co\_D}$, is 5% by mass or higher and the content proportion of Fe, $In_{Fe\_D}$, is at 11% by mass or higher. Thereby, according to the manufacturing method of the present embodiment, when the surface-treated steel sheet 1, 1a according to the present embodiment to be obtained is used as the battery case, an obtained battery can be low in the internal resistance value, which leads to excellent in the battery characteristics, and also has excellent corrosion resistance to a strong alkaline electrolyte solution, which leads to suppression of impairing the battery characteristics also after lapse of time; thus, the battery case can suitably be used as battery cases of batteries using a strong alkaline electrolyte solution. In particular, the surface-treated steel sheet 1, 1a according to the present embodiment can suitably be used as battery cases of batteries having a mechanism of releasing gases generated in the interior of the batteries. This is because, even if gases in trace amounts are generated due to dissolving-out of cobalt and iron from the nickel-cobalt-iron diffusion layer 12 formed on the inner surface side of the battery cases, the generated gases can suitably be released.

In the above, there has been exemplified the method for forming the nickel-cobalt-iron diffusion layer 12 by forming the nickel plating layer 13 and the nickel-cobalt alloy plating layer 14 in this order on the steel sheet 11, and thereafter heat treating the resultant to cause iron, nickel and cobalt contained in the each layer to thermally diffuse. However, in place of such a method, a method can be adopted in which the nickel-cobalt-iron diffusion layer 12 is formed by forming a nickel-cobalt alloy plating layer 14' alone directly on the surface of the steel sheet 11 without forming any nickel plating layer 13, and thereafter the resultant is heat treated to cause the steel sheet 11 and the nickel-cobalt alloy plating layer 14' to thermally diffuse.

Hereinafter, there will be described a method for manufacturing the surface-treated steel sheet 1 in which the nickel-cobalt-iron diffusion layer 12 is formed by forming the nickel-cobalt alloy plating layer 14' alone without forming any nickel plating layer 13, and thereafter heat treating the resultant.

A nickel-cobalt alloy plating bath for forming the nickel-cobalt alloy plating layer 14' is not especially limited, but it is preferable to use a plating bath having, as a base, a Watts bath containing nickel sulfate, nickel chloride, cobalt sulfate and boric acid. Here, the cobalt/nickel ratio in the nickel-cobalt alloy plating bath is preferably in the range of 0.05 to 1.0 and more preferably in the range of 0.1 to 0.7, in terms of a molar ratio of cobalt/nickel. For example, in the case of using a plating bath having, as a base, a Watts bath containing nickel sulfate, nickel chloride, cobalt sulfate and boric acid, a plating bath can be used which is prepared by suitably adjusting the contents of the respective components in the ranges of nickel sulfate: 10 to 300 g/L, nickel chloride: 20 to 60 g/L, cobalt sulfate: 10 to 250 g/L and boric acid: 10 to 40 g/L and also in the above range of the cobalt/nickel ratio. It is preferable that the nickel-cobalt alloy plating be carried out under the conditions of a bath temperature of 40 to 80° C., a pH of 1.5 to 5.0 and a current density of 1 to 40 A/dm$^2$.

The total content of nickel and cobalt in the nickel-cobalt alloy plating layer 14' is preferably 11.5 g/m² or lower, more preferably 10.0 g/m² or lower, still more preferably 9.0 g/m² or lower and especially preferably 7.5 g/m² or lower. Here, the content of nickel and cobalt in the nickel-cobalt alloy plating layer 14' can be determined by carrying out X-ray fluorescence analysis on the steel sheet 11 having the nickel-cobalt alloy plating layer 14' formed thereon, and measuring the total amount of nickel atoms and cobalt atoms deposited forming the nickel-cobalt alloy plating layer 14'. The lower limit of the total content of nickel and cobalt in the nickel-cobalt alloy plating layer 14' is not especially limited, but is preferably 1.6 g/m² or higher, more preferably 2.5 g/m² or higher, still more preferably 3.0 g/m² or higher and especially preferably 3.5 g/m² or higher. When a heat treatment as described later is carried out on the steel sheet 11 having the nickel-cobalt alloy plating layer 14' formed thereon, iron in the steel sheet 11 is enabled to thermally diffuse successfully to the surface of the nickel-cobalt alloy plating layer 14' by the heat treatment and the nickel-cobalt-iron diffusion layer 12 can be successfully famed, if the total content of nickel and cobalt contained in the nickel-cobalt alloy plating layer 14' is in the above range.

Then, by carrying out the heat treatment on the steel sheet 11 having the nickel-cobalt alloy plating layer 14' formed thereon, iron in the steel sheet 11 and nickel and cobalt in the nickel-cobalt alloy plating layer 14' are caused to mutually thermally diffuse to thereby form the nickel-cobalt-iron diffusion layer 12. Thereby, as illustrated in FIG. 3, there is provided the surface-treated steel sheet 1 having the nickel-cobalt-iron diffusion layer 12 formed on the steel sheet 11. This manufacturing method, because of the nature thereof, does not suit to making the constitution further having the iron-nickel diffusion layer 15 between the steel sheet 11 and the nickel-cobalt-iron diffusion layer 12 like the surface-treated steel sheet 1a illustrated in FIG. 6.

The heat treatment condition may suitably be selected according to the total content of nickel and cobalt in the nickel-cobalt alloy plating layer 14'. The heat treatment temperature is preferably 480 to 900° C., more preferably 500 to 800° C. and still more preferably 520 to 750° C. Then the uniform heating time (time in which the above heat treatment temperature is held) in the heat treatment is preferably 3 sec to 2 min, more preferably 10 sec to 1.5 min and still more preferably 20 to 60 sec. A method of the thermal diffusion treatment may be either of continuous annealing and batch annealing, but is preferably continuous annealing, in which the heat treatment temperature and the heat treatment time can easily be adjusted in the above ranges.

According to the above manufacturing method, by controlling the total content of nickel and cobalt in the nickel-cobalt alloy plating layer 14 and the heat treatment condition in the respective above ranges, the nickel-cobalt-iron diffusion layer 12 can be made in which: the content of Co, $In_{Co\_D}$, is controlled at 5% by mass or higher and the content of Fe, $In_{Fe\_D}$, at 11% by mass or higher. Thereby, when the surface-treated steel sheet 1 according to the present embodiment to be obtained is used as the battery case, an obtained battery can be low in the internal resistance value, which leads to excellent in the battery characteristics, and also has excellent corrosion resistance to a strong alkaline electrolyte solution, which leads to suppression of impairing the battery characteristics also after lapse of time; thus, the battery case can suitably be used as battery cases of batteries using a strong alkaline electrolyte solution. In particular, the surface-treated steel sheet 1 according to the present embodiment can suitably be used as battery cases of batteries having a mechanism of releasing gases generated in the interior of the batteries. This is because, even if gases in trace amounts are generated due to dissolving-out of cobalt and iron from the nickel-cobalt-iron diffusion layer 12 formed on the inner surface side of the cases, the generated gases can suitably be released.

EXAMPLES

Hereinafter, the present invention will be described more specifically by way of Examples, but the present invention is not limited to these Examples.

Here, the definition and the evaluation method of each physical property were as follows.

<Amount of Ni and Amount of Co>

By carrying out a measurement on the surface of the surface-treated steel sheet by an X-ray fluorescence analyzer (manufactured by Rigaku Corp., ZSX100e), the amount of Ni and the amount of Co contained in the nickel-cobalt-iron diffusion layer were measured (in the case where the iron-nickel diffusion layer was formed between the steel sheet and the nickel-cobalt-iron diffusion layer, the total amount of Ni and the total amount of Co contained in the nickel-cobalt-iron diffusion layer and the iron-nickel diffusion layer).

<Content of Ni, $In_{Ni\_D}$, Content of Co, $In_{Co\_D}$, and Content of Fe, $In_{Fe\_D}$>

For the surface-treated steel sheet, the Ni intensity, the Co intensity and the Fe intensity were measured sequentially in the depth direction from the surface side of the nickel-cobalt-iron diffusion layer toward the steel sheet by a radio frequency glow discharge optical emission spectrometry according to the above-mentioned method, and the content of Ni, $In_{Ni\_D}$, the content of Co, $In_{Co\_D}$, and the content of Fe, $In_{Fe\_D}$, were determined based on the obtained Ni intensity, Co intensity and Fe intensity, respectively. Further based on the results, there was also determined the ratio of the content of Fe, $In_{Fe\_D}$, to the content of Co, $In_{Co\_D}$ (i.e., $R_{Fe/Co}$ ($In_{Fe\_D}/In_{Co\_D}$)). Here, the measurement conditions in the radio frequency glow discharge optical emission spectrometry were as follows.

Measuring instrument: a Marcus-type radio frequency glow discharge optical emission spectrometer (manufactured by HORIBA, Ltd., model number: GD-Profiler 2)

Voltage (H.V.) of a photomultiplier channel: 785 V for Fe; 630 V for Ni; and 720 V for Co Anode diameter: 44 mm Gas kind: Ar Fetching interval: 0.05 sec Gas pressure: 600 Pa Output: 35 W <Corrosion Current Density>

The surface-treated steel sheet was cut to prepare a strip test piece of 20 mm in width and 40 mm in length. The measurement area was set at ϕ6 mm in the test piece. The test piece was immersed in a 10M potassium hydroxide aqueous solution at a temperature of 25° C.; and the measurement was carried out by using an electrochemical measuring system (manufactured by Hokuto Denko Corp., model number: HZ-5000) with a silver/silver chloride electrode as a reference electrode and platinum as a counter electrode, and sweeping the potential from −800 mV to 800 mV at a rate of 50 MV/min. Then, based on the measurement result, the current density at the time point when the potential was 100 mV was obtained as a corrosion current density.

Here, in the evaluation of the corrosion current density, when the corrosion current density was 0.01 mA/cm² or lower, preferably 0.006 mA/cm² or lower, the dissolving-out resistance of the surface-treated steel sheet was judged to be excellent.

<Contact Resistance Value>

The surface-treated steel sheet was cut according to JIS Z2241: 2011 "Method of tensile test for metallic materials" to thereby prepare No. 13B test pieces. Then, the contact resistance value of one of the test pieces was measured by using an electric contact simulator (manufactured by Yamazaki-seiki Co., Ltd., model number: CRS-1) under the condition of a contact load of 100 gf to thereby obtain a contact resistance value of the test piece at the first time. Then, the test piece whose first-time contact resistance value had been measured was subjected to a tensile test using a desktop precision universal testing machine (manufactured by Shimadzu Corp., model number: AGS-X) under the condition of a tensile rate of 20%, and then the test piece after the tensile test was subjected to the same measurement to thereby obtain a contact resistance value at the second time. Further, the test piece whose contact resistance value at the second time had been measured was immersed in a 10M potassium hydroxide aqueous solution under the condition of 60° C. for 20 days, thereafter pulled up from the potassium hydroxide aqueous solution, and then subjected again to the same measurement to thereby obtain a contact resistance value of the test piece at the third time. Then, the found contact resistance values are indicated in Table 1 described later and in Table 1, the contact resistance value at the first time is represented as "before tension"; the contact resistance value at the second time, as "before a lapse of time"; and the contact resistance value at the third time, as "after the lapse of time". Further in Table 1, the difference between the contact resistance value at the second time and the contact resistance value at the third time is represented as "Difference between before and after a lapse of time". Then, in the evaluation of the contact resistance values, when the measurement value "after the lapse of time" was 14 mΩ or lower, it is judged that the surface-treated steel sheet suppresses the deterioration of battery characteristics after the lapse of time; and further when 12 mΩ or lower, it is judged that the surface-treated steel sheet more suppresses the deterioration of battery characteristics.

Example 1

As a metal sheet, there was provided a steel sheet obtained by annealing a TM rolled sheet (thickness: 0.25 mm) of a low-carbon aluminum-killed steel having the following chemical composition.

C: 0.04% by weight, Mn: 0.21% by weight, Si: 0.02% by weight, P: 0.012% by weight, S: 0.009% by weight, Al: 0.061% by weight, N: 0.0036% by weight, and the balance: Fe and inevitable impurities Then, the steel sheet was subjected to alkali electrolytic degreasing and acid pickling by immersion in sulfuric acid, and thereafter nickel plated under the following condition to thereby form a nickel plating layer having an amount of Ni deposited of 2.67 g/m².

<Nickel Plating>

Bath composition: 250 g/L of nickel sulfate, 45 g/L of nickel chloride, 30 g/L of boric acid pH: 3.6 to 4.6

Current density: 20 A/dm²

Then, the steel sheet having the nickel plating layer famed thereon was subjected to nickel-cobalt alloy plating under the following condition to thereby form a nickel-cobalt alloy plating layer on the nickel plating layer.

<Nickel-Cobalt Alloy Plating>

Bath composition of the plating bath: containing nickel sulfate, nickel chloride, cobalt sulfate, cobalt chloride and boric acid, and having a molar ratio of cobalt/nickel of 0.30 pH: 3.6 to 4.6

Bath temperature: 60° C.

Current density: 20 A/dm²

Figure 7:
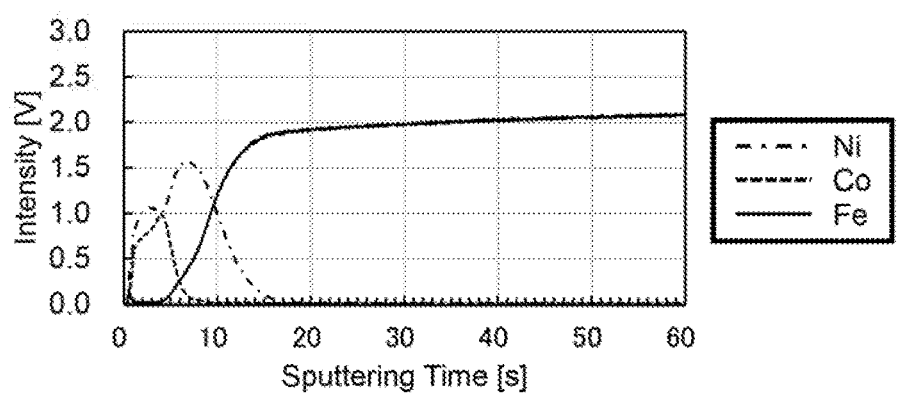
FIG. 7 is graphs showing results of measurement on surface-treated steel sheets of Examples by a radio frequency glow discharge optical emission spectrometer.
Figure 7:
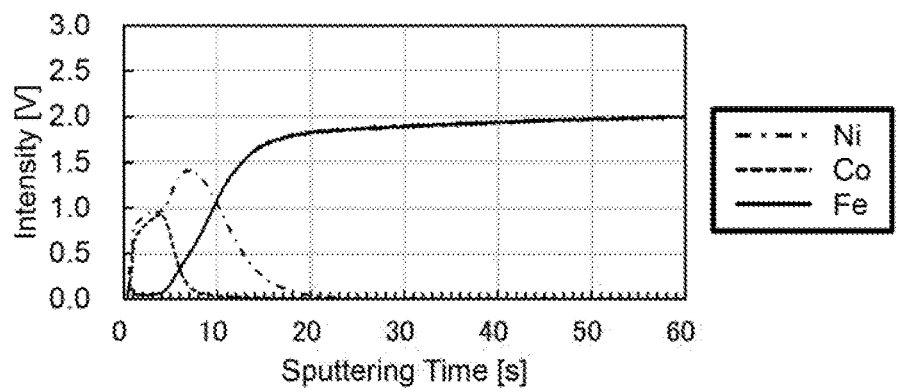
Figure 7:
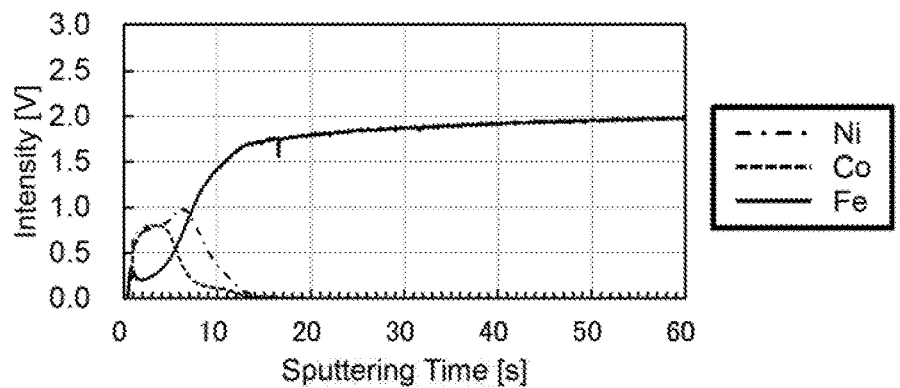
Figure 7:
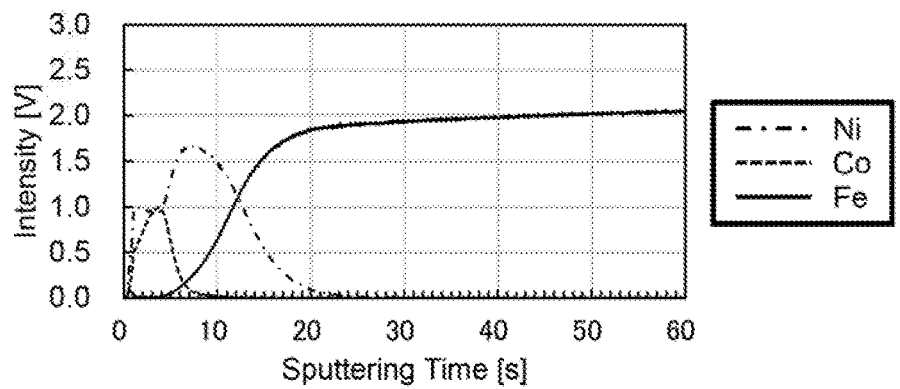
Figure 8:
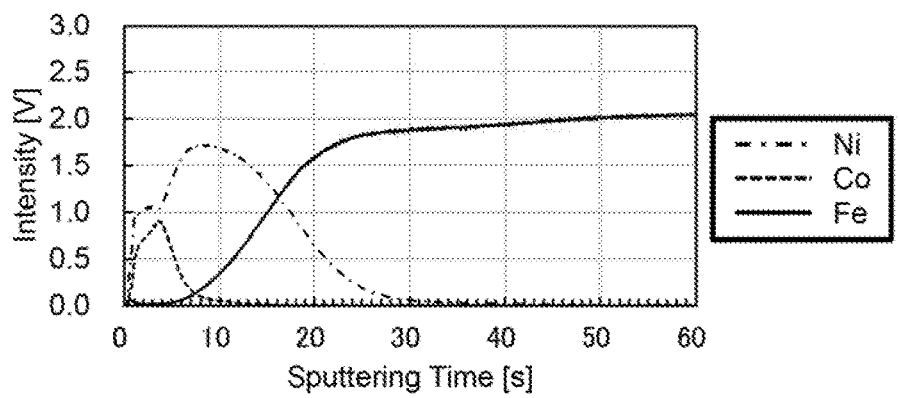
FIG. 8 is graphs showing results of measurement on surface-treated steel sheets of Examples by the radio frequency glow discharge optical emission spectrometer.
Figure 8:
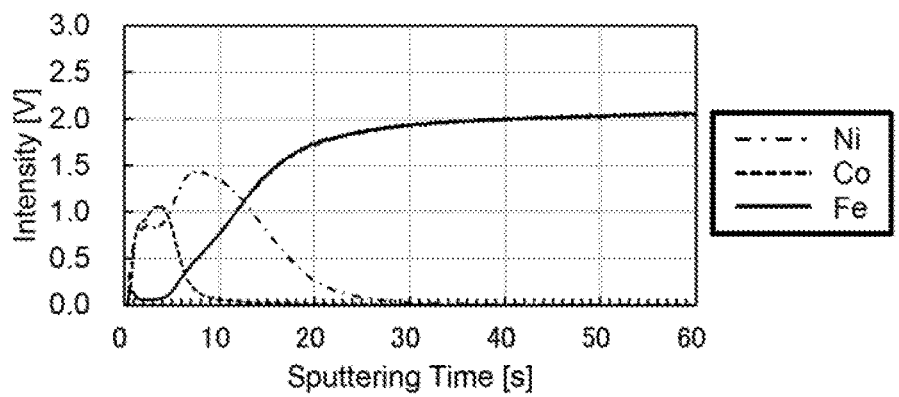
Figure 8:
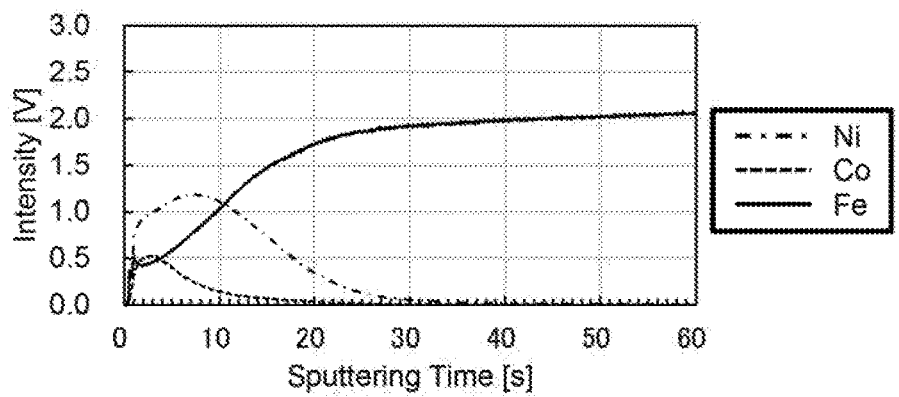

Then, the steel sheet having the nickel plating layer and the nickel-cobalt alloy plating layer formed thereon was subjected to continuous annealing (heat treatment) under the condition that a heat treatment temperature of 600° C. was held for 40 sec to form a nickel-cobalt-iron diffusion layer, to thereby obtain a surface-treated steel sheet. The obtained surface-treated steel sheet was evaluated for the amount of Ni, the amount of Co, the content of Ni, $In_{Ni\_D}$, the content of Co, $In_{Co\_D}$, the content of Fe, $In_{Fe\_D}$, the corrosion current density and the contact resistance value, according to the above methods. Results are shown in Table 1 and FIG. 7(A). Here, FIG. 7(A) is graphs indicating results obtained by measurement on the surface-treated steel sheet by radio frequency glow discharge optical emission spectrometry in determining the content of Ni, $In_{Ni\_D}$, the content of Co, $In_{Co\_D}$ the content of Fe, $In_{Fe\_D}$.

Examples 2 to 7

Surface-treated steel sheets were prepared and evaluated as in Example 1, except for altering the amount of nickel deposited when the nickel plating layer was formed, the molar ratio of cobalt/nickel in the plating bath used when the nickel-cobalt alloy plating layer was formed, and the heat treatment temperature when the heat treatment was carried out to those indicated in Table 1. Results are shown in Table 1, FIG. 7(B) to FIG. 7(D), and FIG. 8(A) to FIG. 8(C).

Comparative Example 1

A surface-treated steel sheet was prepared and evaluated as in Example 1, except for altering the amount of nickel deposited when the nickel plating layer was formed, and the heat treatment temperature when the heat treatment was carried out to those indicated in Table 1. Results are shown in Table 1, and FIG. 9(A).

Comparative Example 2

Figure 9:
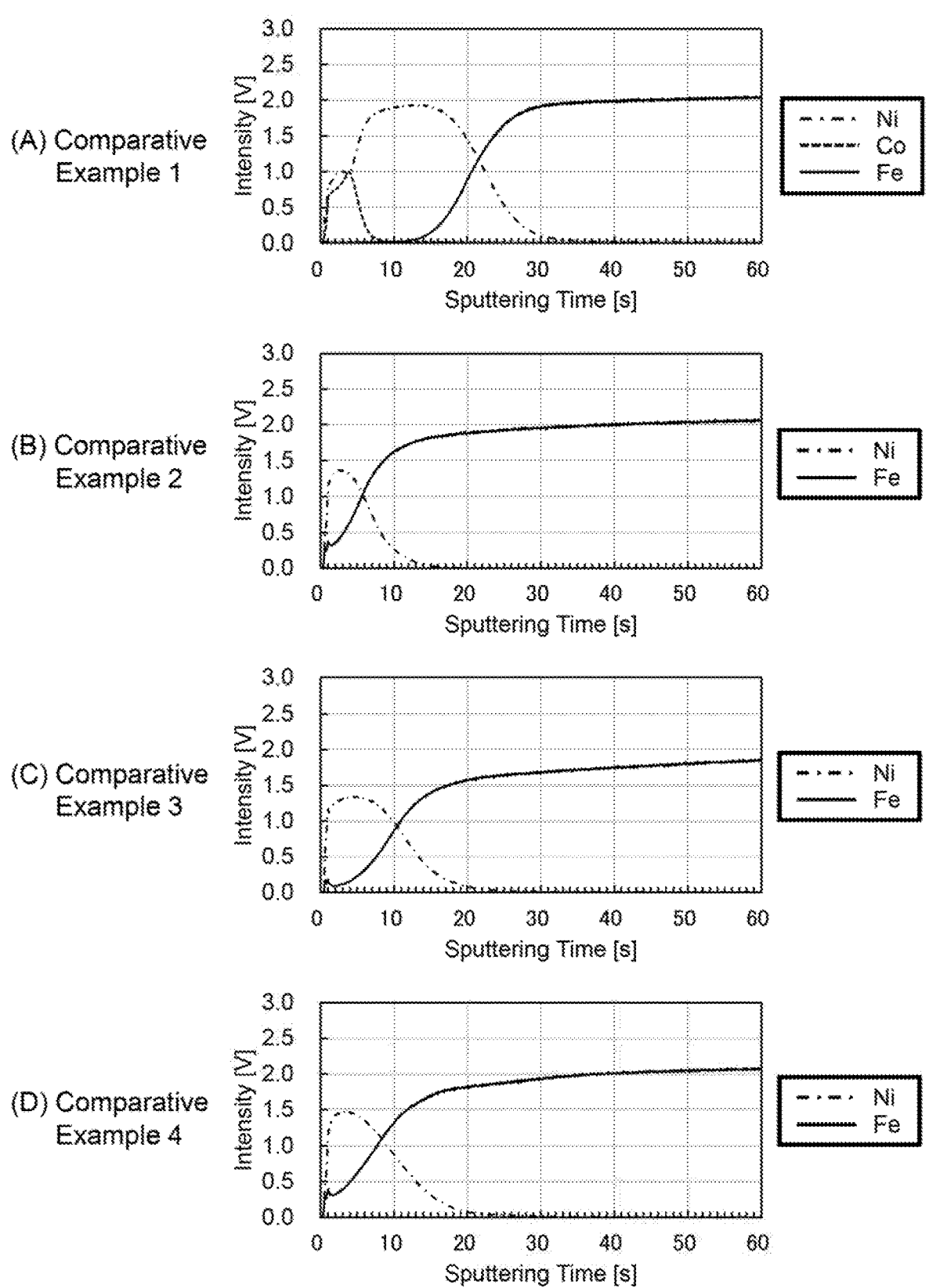
FIG. 9 is graphs showing results of measurement on surface-treated steel sheets of Comparative Examples by the radio frequency glow discharge optical emission spectrometer.

A surface-treated steel sheet was prepared and evaluated as in Example 1, except for altering the amount of nickel deposited when the nickel plating layer was formed to that indicated in Table 1, and carrying out continuous annealing (heat treatment) under the condition that a heat treatment temperature of 700° C. was held for 40 sec on a steel sheet having no nickel-cobalt alloy plating layer formed thereon and having the nickel plating layer alone formed thereon Results are shown in Table 1, and FIG. 9(B). In Comparative Example 2, the plating bath contained no cobalt and no cobalt was detected in the measurement by the X-ray fluorescence analysis; however, in the measurement by the radio frequency glow discharge optical emission spectrometry, cobalt ends up being detected as a measurement result in some cases, since the emission wavelength of cobalt was near the emission wavelengths of nickel and iron. Since the surface-treated steel sheet of Comparative Example 2 had no nickel-cobalt alloy plating layer foiled thereon, no cobalt was contained therein. Accordingly, the calculation of the content of the each element based on the intensity ratio obtained by the radio frequency glow discharge optical emission spectrometry was carried out as follows: since the content of Co, $In_{Co\_D}$, calculated based on the Co intensity as a measurement result was a very low value of 2% by mass or lower, it was judged that no cobalt was contained, and the content of Ni, $In_{Ni\_D}$, and the content of Fe, $In_{Fe\_D}$, were determined based on the ratio of the Ni intensity and the ratio of the Fe intensity when the total of the Ni intensity and the Fe intensity was taken to be 100%. Further in Comparative Example 2, no calculation of the ratio $R_{Fe/Co}$ was carried out. The same applied to Comparative Examples 3, 4 described later.

Comparative Examples 3, 4

Surface-treated steel sheets were prepared and evaluated as in Comparative Example 1, except for altering the amount of nickel deposited when the nickel plating layer was formed, and the heat treatment temperature when the heat treatment was carried out to those indicated in Table 1. Results are shown in Table 1, FIG. 9(C) and FIG. 9(D).

TABLE 1

| | Manufacturing Condition | | | Surface-Treated Metal Sheet | | | | | | | Evaluation | | | | |
|---|---|---|---|---|---|---|---|---|---|---|---|---|---|---|---|
| | | | | | | | | | | | | Contact Resistance Value | | | |
| | Amount of Nickel Plating Layer Deposited [g/m²] | Co/Ni Molar Ratio in Nickel-Cobalt Plating Bath | Heat Treatment Temperature [° C.] | Amount of Ni + Amount of Co [g/m²] | Amount of Ni [g/m²] | Amount of Co [g/m²] | Content of Ni, $In_{Ni\_D}$ [% by mass] | Content of Co, $In_{Co\_D}$ [% by mass] | Content of Fe, $In_{Fe\_D}$ [% by mass] | Ratio $R_{Fe/Co}$ | Corrosion Current Density [mA/cm²] | Before Tension [mΩ] | Before Lapse of Time [mΩ] | After Lapse of Time [mΩ] | Difference between Before and After Lapse of Time [mΩ] |
| Example 1 | 2.67 | 0.30 | 600° C. | 4.67 | 3.70 | 0.97 | 34.55 | 21.16 | 44.29 | 2.09 | 0.00346 | 2.19 | 2.84 | 7.83 | 5.00 |
| Example 2 | 2.67 | 0.30 | 700° C. | 4.69 | 3.67 | 1.02 | 26.24 | 26.47 | 47.29 | 1.79 | 0.00432 | 2.01 | 2.36 | 7.17 | 4.80 |
| Example 3 | 0.89 | 0.30 | 700° C. | 2.70 | 1.75 | 0.95 | 11.59 | 27.02 | 61.39 | 2.27 | 0.00536 | 2.13 | 2.38 | 5.25 | 2.88 |
| Example 4 | 4.45 | 0.30 | 700° C. | 6.31 | 5.37 | 0.94 | 46.36 | 26.21 | 27.44 | 1.05 | 0.00340 | 2.14 | 2.08 | 8.33 | 6.26 |
| Example 5 | 7.12 | 0.30 | 700° C. | 9.05 | 8.06 | 0.99 | 60.06 | 21.34 | 18.60 | 0.87 | 0.00297 | 1.95 | 2.03 | 8.33 | 6.31 |
| Example 6 | 5.36 | 0.20 | 700° C. | 7.51 | 6.03 | 1.48 | 26.66 | 26.61 | 46.73 | 1.76 | 0.00484 | 2.30 | 2.95 | 6.00 | 3.05 |
| Example 7 | 4.45 | 0.30 | 800° C. | 6.28 | 5.37 | 0.91 | 9.31 | 8.59 | 82.10 | 9.56 | 0.00450 | 2.08 | 2.56 | 5.75 | 3.19 |
| Comparative Example 1 | 10.68 | 0.30 | 700° C. | 12.52 | 11.51 | 1.01 | 67.38 | 22.27 | 10.35 | 0.46 | 0.00360 | 2.01 | 2.18 | 14.25 | 12.08 |
| Comparative Example 2 | 2.71 | N/A | 700° C. | 2.71 | 2.71 | 0 | 34.67 | — | 65.33 | — | 0.00383 | 2.08 | 2.36 | 679.00 | 676.64 |
| Comparative Example 3 | 4.42 | N/A | 700° C. | 4.42 | 4.42 | 0 | 64.94 | — | 35.06 | — | 0.00241 | 1.94 | 1.90 | 791.50 | 789.60 |
| Comparative Example 4 | 4.42 | N/A | 730° C. | 4.42 | 4.42 | 0 | 36.67 | — | 63.33 | — | 0.00399 | 2.04 | 2.24 | 106.50 | 104.26 |

As indicated in Table 1, it was confirmed that the surface-treated steel sheets having a nickel-cobalt-iron diffusion layer in which the content of Co, $In_{Co\_D}$, was 5% by mass or higher and the content of Fe, $In_{Fe\_D}$, was 11% by mass or higher had a corrosion current density of 0.01 mA/cm$^2$ or lower, preferably 0.006 mA/cm$^2$ or lower, and a contact resistance value after the lapse of time of 12 mΩ or lower, and that the surface-treated steel sheets were thus excellent in the dissolving-out resistance and moreover suppressed the deterioration of the battery characteristics after the lapse of time (Examples 1 to 7).

By contrast, as indicated in Table 1, it was confirmed that the surface-treated steel sheet whose content of Fe, $In_{Fe\_D}$, was lower than 11% by mass had a contact resistance value after the lapse of time of higher than 14 mΩ, and that the surface-treated steel sheet thus had an adverse effect on the battery characteristics after the lapse of time (Comparative Example 1).

Further as indicated in Table 1, it was confirmed that the surface-treated steel sheets whose content of Co, $In_{Co\_D}$, was lower than 5% by mass had a contact resistance value after the lapse of time of higher than 100 mΩ, and that the surface-treated steel sheet thus had an adverse effect on the battery characteristics after the lapse of time (Comparative Examples 2 to 4).

Further from the results of Examples 1 to 7 and Comparative Examples 1 to 4, the present inventors have confined the following. In a surface-treated steel sheet whose outermost surface layer was a layer formed only of cobalt, the corrosion current density measured by the above method was about 0.06 mA/cm$^2$, whereas in the surface-treated steel sheet whose outermost surface layer was a layer formed only of nickel and cobalt (the surface-treated steel sheet of Comparative Example 1, in which the content of Fe, $In_{Fe\_D}$, was a very low value of 10.35% by mass and thus almost no iron was present in the outermost surface layer), the corrosion current density decreased to about 0.00360 mA/cm$^2$. From such a finding it was expected that along with the reduction of the content of nickel in the outermost surface layer, the corrosion current density would rise. Contrary to such an expectation, the present inventors have found that the increase of the corrosion current density could be suppressed when the outermost surface layer was a ternary layer of nickel, cobalt and iron even with a decreased content of nickel as in the above-mentioned Examples 1 to 7. In other words, since the surface-treated steel sheet of Comparative Example 1 described above had a corrosion current density of about 0.00360 mA/cm$^2$ with the value of a content of Ni, $In_{Ni\_D}$, of 67.38% by mass, it was expected that the surface-treated steel sheets having a lower content of Ni, $In_{Ni\_D}$, (surface-treated steel sheets whose outermost surface layer had a lower content of nickel) than in Comparative Example 1, for example, the surface-treated steel sheet of Example 1 (content of Ni, $In_{Ni\_D}$: 34.55) had a higher corrosion current density than 0.00360 mA/cm$^2$; however, contrary to such an expectation, it was found that the corrosion current density was actually as low as 0.00346 mA/cm$^2$. The present inventors, based on such a finding, have found that with regard to the nickel-cobalt-iron diffusion layer to be formed as the outermost surface layer of the surface-treated steel sheet, the improvement of the battery characteristics was attained by cobalt contained, and even when the content of nickel reduced, the rise of the corrosion current density could be suppressed by the nickel-cobalt-iron ternary system.

There is not necessarily made clear the reason why the surface-treated steel sheets having the ternary nickel-cobalt-iron diffusion layer formed thereon as the outermost surface layer could more prevent the rise of the corrosion current density than the surface-treated steel sheet having a layer composed only of nickel and cobalt as the outermost surface layer. However, it is conceivable that with regarding to forming the ternary nickel-cobalt-iron diffusion layer as the outermost surface layer of the surface-treated steel sheet, the ternary system of nickel, cobalt and iron has a smaller difference in potential between the elements and thus more suppresses the dissolving-out of cobalt than the binary system of nickel and cobalt when the surface-treated steel sheet is immersed in a potassium hydroxide aqueous solution to measure the corrosion current density.

The present inventors further have found that, in the surface-treated steel sheets having the ternary nickel-cobalt-iron diffusion layer as in Examples 1 to 7 formed, the action of the ternary nickel-cobalt-iron diffusion layer can suppress the dissolving-out of cobalt to prevent the rise of the corrosion current density otherwise caused by the dissolving-out of cobalt even though cobalt was contained in the outermost surface layer, compared with the surface-treated steel sheets having a layer composed only of iron and nickel as the outermost surface layer formed. For example, as indicated in Table 1, compared Example 1 (content of Ni, $In_{Ni\_D}$: 34.55, content of Co, $In_{Co\_D}$: 21.16) with Comparative Example 2 (content of Ni, $In_{Ni\_D}$: 34.67), since the contents of Ni, $In_{Ni\_D}$, in these Examples had nearly the same value, the actions by nickel in these Examples were considered to be nearly equal; on the other hand, since the surface-treated steel sheet of Example 1 had a higher content of Co, $In_{Co\_D}$, (the content of cobalt was higher) than that of Comparative Example 2, it was expected that the surface-treated steel sheet of Example 1 is more likely to dissolve out cobalt to resulting in a higher corrosion current density than that of Comparative Example 2; however, contrary to such an expectation, the surface-treated steel sheet of Example 1 had a lower corrosion current density than the surface-treated steel sheet of Comparative Example 2 (the corrosion current density of Example 1: 0.00346 mA/cm$^2$, the corrosion current density of Comparative Example 2: 0.00383 mA/cm$^2$). From such results, it has been found that the action of the ternary nickel-cobalt-iron diffusion layer suppressed the dissolving-out of cobalt to prevent the rise of the corrosion current density otherwise caused by the dissolving-out of cobalt. In addition, in the surface-treated steel sheets having the nickel-cobalt-iron diffusion layer formed as the outermost surface layer, it might be expected that the presence of iron on the outermost surface layer would easily bring about the reduction of the rustproofness, but contrary to such an expectation, it is considered that the reduction of the rustproofness by iron is suppressed by the action of the ternary nickel-cobalt-iron diffusion layer.

Figure 10:
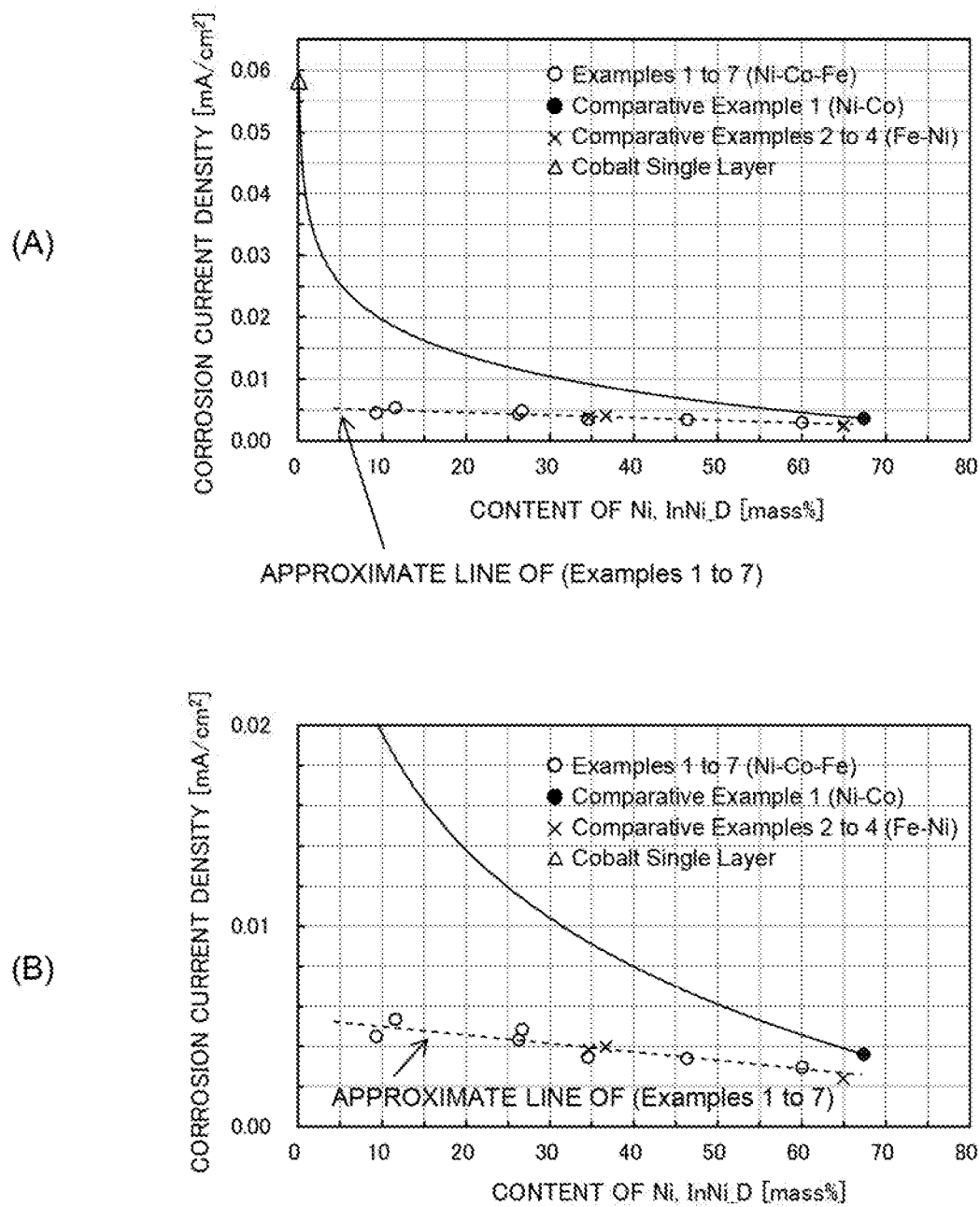
FIG. 10 is plotted graphs of measurement results of the corrosion current density of surface-treated steel sheets of Examples and Comparative Examples.

FIG. 10(A) and FIG. 10(B) are graphs obtained by plotting relations between the measurement results of the corrosion current density and the contents of Ni, $In_{Ni\_D}$, for Examples 1 to 7 (samples whose outermost surface layer was the nickel-cobalt-iron diffusion layer), Comparative Example 1 (sample whose outermost surface layer was conceivably a nickel-cobalt diffusion layer having almost no iron present) and Comparative Examples 2, 3, 4 (samples whose outermost surface layer was conceivably an iron-nickel diffusion layer). In FIG. 10(A), the broken line shown is an approximate line of plots of Examples 1 to 7. Then, the surface-treated steel sheet whose outermost surface layer was a layer formed only of cobalt had a corrosion current density measured by the above method of about 0.06 mA/cm$^2$ as described above, and the solid line shown is an approximate curve obtained from this result and the plot of Comparative Example 1. Further FIG. 10(B) is enlarged graphs of a part of FIG. 10(A). The following is clear from the relation between the solid line and the broken line in FIG. 10(A) and FIG. 10(B). It is presumed from the relation between the solid line and the broken line in FIG. 10(A) and FIG. 10(B) that, compared with the surface-treated steel sheets having the nickel-cobalt-iron diffusion layer formed thereon according to the present invention like Example 2, in which the content of Ni, $In_{Ni\_D}$, was about 26% by mass, and Example 4, in which the content of Ni, $In_{Ni\_D}$, was about 46% by mass, surface-treated steel sheets having a nickel-cobalt diffusion layer (containing no iron) formed thereon having the same value of the content of Ni, $In_{Ni\_D}$, as of Example 2 or Example 4 (for example, a surface-treated steel sheet in which the content of Ni, $In_{Ni}$ D, was 26% by mass and the content of Co, $In_{Co\_D}$, was 74% by mass and a surface-treated steel sheet in which the content of Ni, $In_{Ni\_D}$, was 46% by mass and the content of Co, $In_{Co\_D}$, was 54% by mass) have a higher corrosion current density. Therefore, it has been made clear that the surface-treated steel sheet having the nickel-cobalt-iron diffusion layer formed thereon according to the invention remarkably suppress the dissolving-out of cobalt and iron even when the content of Ni, $In_{Ni\_D}$, is low. The reason therefor has not been necessarily made clear, but it is conceivable that with regarding to forming the ternary nickel-cobalt-iron diffusion layer as the outermost surface layer of the surface-treated steel sheet, the ternary system of nickel, cobalt and iron has a smaller difference in potential between the elements and thus more suppresses the dissolving-out of cobalt and iron than the binary system of nickel and cobalt when the surface-treated steel sheet is immersed in a potassium hydroxide aqueous solution to measure the corrosion current density.

Example 8

Figure 11:
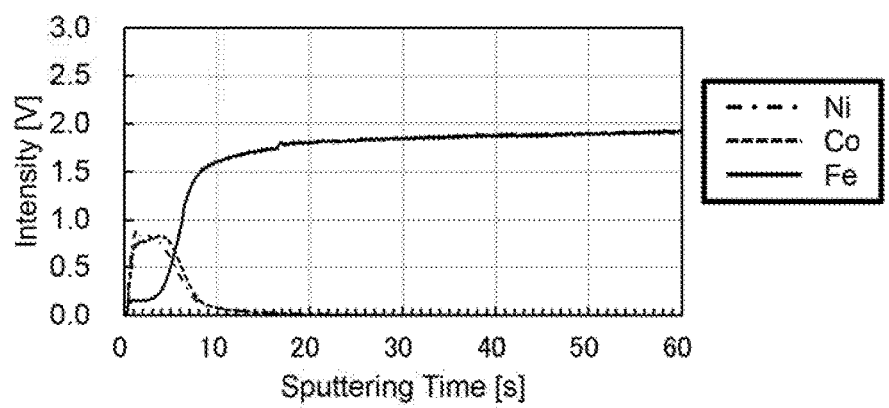
FIG. 11 is graphs showing results of measurement on surface-treated steel sheets of Examples by the radio frequency glow discharge optical emission spectrometer.
Figure 11:
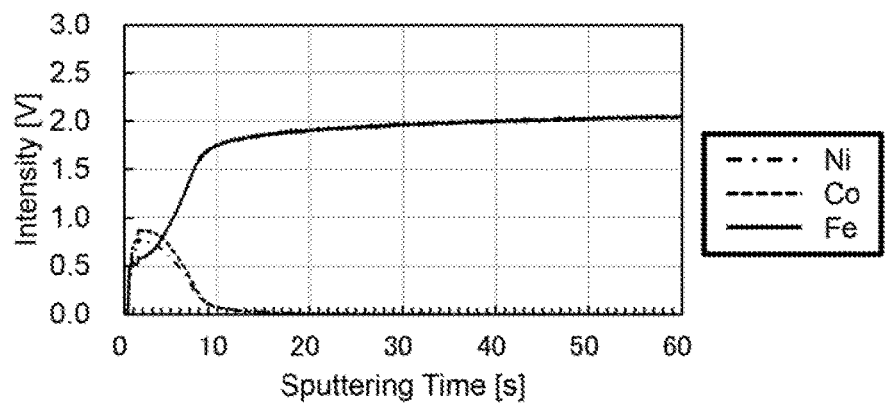
Figure 11:
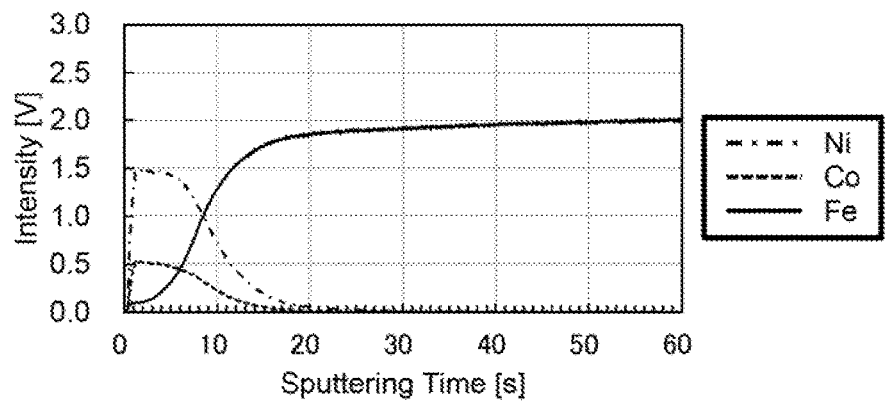
Figure 12:
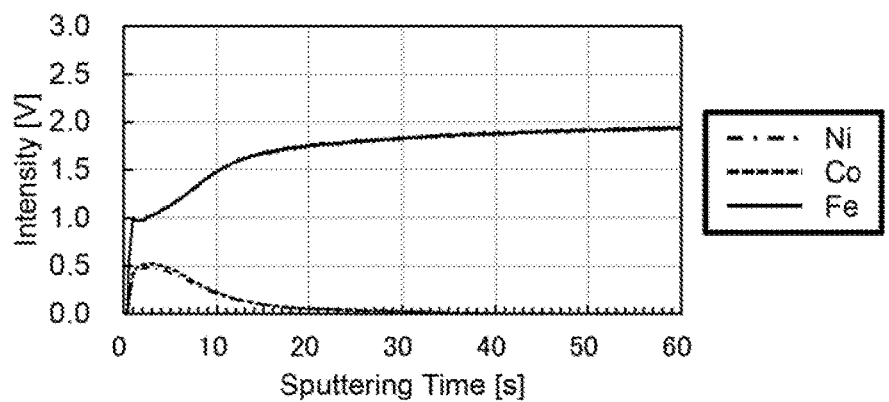
FIG. 12 is graphs showing results of measurement on surface-treated steel sheets of Examples by the radio frequency glow discharge optical emission spectrometer.
Figure 12:
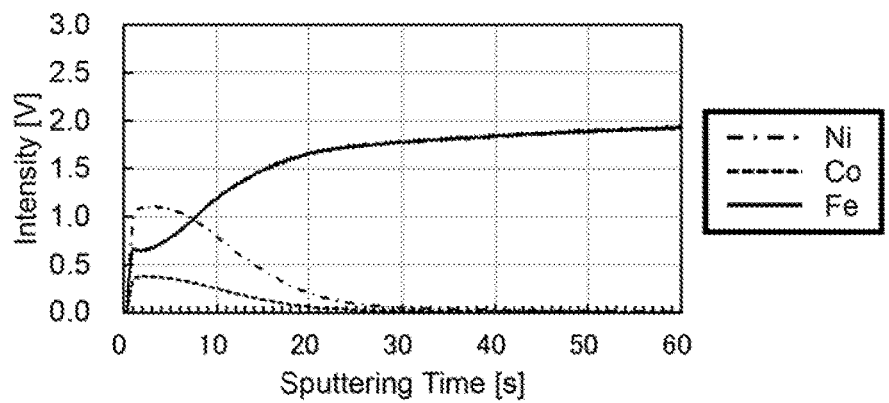

A surface-treated steel sheet was prepared and evaluated as in Example 1, except for forming no nickel plating layer, forming the nickel-cobalt alloy plating layer directly on the steel sheet under the same condition as in Example 1 and carrying out the heat treatment under the same condition as in Example 1. Results are shown in Table 2, and FIG. 11(A).

Examples 9 to 13

Surface-treated steel sheets were prepared and evaluated as in Example 8, except for altering the molar ratio of cobalt/nickel in the plating bath used when the nickel-cobalt alloy plating layer was formed, and the heat treatment temperature when the heat treatment was carried out to those indicated in Table 2. Results are shown in Table 2, FIG. 11(B), FIG. 11(C), FIG. 12(A) and FIG. 12(B).

TABLE 2

| | Manufacturing Condition | | | Surface-Treated Metal Sheet | | | | | | | Evaluation | | Contact Resistance Value | | |
|---|---|---|---|---|---|---|---|---|---|---|---|---|---|---|---|
| | Amount of Nickel Plating Layer Deposited [g/m²] | Co/Ni Molar Ratio in Nickel-Cobalt Plating Bath | Heat Treatment Temperature [° C.] | Amount of Ni + Amount of Co [g/m²] | Amount of Ni [g/m²] | Amount of Co [g/m²] | Content of Ni, $In_{Ni\_D}$ [% by mass] | Content of Co, $In_{Co\_D}$ [% by mass] | Content of Fe, $In_{Fe\_D}$ [% by mass] | Ratio $R_{Fe/Co}$ | Corrosion Current Density [mA/cm²] | Before Tension [mΩ] | Before Lapse of Time [mΩ] | After Lapse of Time [mΩ] | Difference between Before and After Lapse of Time [mΩ] |
| Example 8 | 0 | 0.30 | 600 | 2.06 | 1.05 | 1.01 | 23.84 | 18.33 | 57.84 | 3.16 | 0.00438 | — | — | — | — |
| Example 9 | 0 | 0.09 | 600 | 4.71 | 3.79 | 0.92 | 47.62 | 23.61 | 28.77 | 1.22 | 0.00430 | 1.43 | 1.73 | 9.30 | 7.57 |
| Example 10 | 0 | 0.30 | 700 | 2.06 | 1.05 | 1.01 | 10.92 | 11.43 | 77.65 | 6.80 | 0.00712 | 1.85 | 2.15 | 5.97 | 3.82 |
| Example 11 | 0 | 0.09 | 700 | 4.71 | 3.79 | 0.92 | 44.49 | 18.10 | 37.42 | 2.07 | 0.00439 | 1.40 | 1.70 | 8.97 | 7.27 |
| Example 12 | 0 | 0.30 | 800 | 2.06 | 1.05 | 1.01 | 12.50 | 8.27 | 79.24 | 9.59 | 0.00802 | 2.08 | 2.38 | 6.47 | 4.08 |
| Example 13 | 0 | 0.09 | 800 | 4.71 | 3.79 | 0.92 | 21.80 | 6.28 | 71.92 | 11.46 | 0.00601 | — | — | — | — |

As shown in Table 2 and FIG. 11(A) to FIG. 12(B), it was confirmed that also in the case where a method was adopted which includes forming the nickel-cobalt alloy plating layer directly on the steel sheet without forming a nickel plating layer for forming the nickel-cobalt-iron diffusion layer, and then carrying out the heat treatment thereon, the corrosion current density is suppressed to 0.01 mA/cm² or lower and the contact resistance value after the lapse of time is 14 mΩ or lower, by a controlled content of Co, $In_{Co\_D}$, in the nickel-cobalt-iron diffusion layer of 5% by mass or higher and a controlled content of Fe, $In_{Fe\_D}$, therein of 11% by mass or higher; thus, the surface-treated steel sheet was excellent in the dissolving-out resistance and also suppressing the deterioration of the battery characteristics after the lapse of time (Examples 8 to 13). Here, for Examples 8 and 13, although the contact resistance value after the lapse of time was not measured, it is conceivable that also in Examples 8 and 13, the contact resistance value after the lapse of time is 14 mΩ or lower in consideration of the results of Examples 9 to 12.

REFERENCE SIGNS LIST 1, 1a—SURFACE-TREATED STEEL SHEET
11—STEEL SHEET
12—NICKEL-COBALT-IRON DIFFUSION LAYER
13—NICKEL PLATING LAYER
14—NICKEL-COBALT ALLOY PLATING LAYER
15—IRON-NICKEL DIFFUSION LAYER
2—ALKALINE BATTERY
21, 21a—POSITIVE ELECTRODE CAN
211—POSITIVE ELECTRODE TERMINAL
22—NEGATIVE ELECTRODE TERMINAL
23—POSITIVE ELECTRODE MIXTURE
24—NEGATIVE ELECTRODE MIXTURE
25—SEPARATOR
26—CURRENT COLLECTOR
27—GASKET
28—INSULATING RING
29—OUTER PACKAGE

The invention claimed is:

1. A surface-treated steel sheet, comprising:
a steel sheet; and
a nickel-cobalt-iron diffusion layer formed as an outermost surface layer on the steel sheet,
wherein when a content of Ni, a content of Co and a content of Fe of the nickel-cobalt-iron diffusion layer are determined based on a Ni intensity, a Co intensity and a Fe intensity each sequentially measured in the depth direction from the surface side of the nickel-cobalt-iron diffusion layer by a radio frequency glow discharge optical emission spectrometry, a content of Co at a specific depth position D, $In_{Co\_D}$, is 8.59% by mass or higher and 65% by mass or lower, a content of Fe at the specific depth position D, $In_{Fe\_D}$, is 18% by mass or higher and 70% by mass or lower, a content of Ni at the specific depth position D, $In_{Ni\_D}$ is 5% by mass or higher and 34.55% by mass or lower, the specific depth position D being a position where the Ni intensity is 0.5% of the maximum value of the Ni intensity, and
wherein the total content of nickel and cobalt in the nickel-cobalt-iron diffusion layer is 9.0 g/m² or lower.

2. The surface-treated steel sheet according to claim 1, wherein the nickel-cobalt-iron diffusion layer has a content of cobalt of 0.2 g/m² or higher.

3. The surface-treated steel sheet according to claim 1, wherein the nickel-cobalt-iron diffusion layer has $R_{Fe/Co}$ ($In_{Fe\_D}/In_{Co\_D}$) of 0.5 to 20, the $R_{Fe/Co}$ ($In_{Fe\_D}/In_{Co\_D}$) being a ratio of the content of Fe, $In_{Fe\_D}$, with respect to the content of Co, $In_{Co\_D}$.

4. The surface-treated steel sheet according to claim 1, further comprising an iron-nickel diffusion layer between the steel sheet and the nickel-cobalt-iron diffusion layer.

5. A battery case comprising the surface-treated steel sheet according to claim 1.

6. A battery comprising the battery case according to claim 5.

7. A method for manufacturing the surface-treated steel sheet according to claim 1, comprising: a step of forming a nickel-cobalt alloy plating layer having a total content of nickel and cobalt of 9.0 g/m² or lower on a steel sheet, and a step of subjecting the steel sheet having the nickel-cobalt alloy plating layer formed thereon to a heat treatment at a temperature of 480 of 900° C. to thereby form the nickel-cobalt-iron diffusion layer as an outermost surface layer.

* * * * *